United States Patent
Reinwald et al.

(10) Patent No.: US 7,415,885 B2
(45) Date of Patent: Aug. 26, 2008

(54) CONCEPT FOR TESTING A PRESSURE SENSOR AND A NOZZLE

(75) Inventors: Franz Reinwald, Wernberg (AT); Stefan Zerlauth, Klagenfurt (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/534,047

(22) Filed: Sep. 21, 2006

(65) Prior Publication Data

US 2007/0068263 A1    Mar. 29, 2007

(30) Foreign Application Priority Data

Sep. 21, 2005    (DE) .................. 10 2005 045 079

(51) Int. Cl.
*G01L 7/00*    (2006.01)
(52) U.S. Cl. .......................... 73/714; 73/716
(58) Field of Classification Search ............ 73/714, 73/716
See application file for complete search history.

(56) References Cited

U.S. PATENT DOCUMENTS

| | | | |
|---|---|---|---|
| 2002/0152794 A1 | 10/2002 | Dietrich et al. | 73/1.57 |
| 2005/0116729 A1 | 6/2005 | Koester et al. | 324/754 |

FOREIGN PATENT DOCUMENTS

| | | |
|---|---|---|
| DE | 100 00 133 C2 | 7/2001 |
| DE | 10 2004 679 A1 | 11/2005 |
| WO | 02/101348 A1 | 12/2002 |

*Primary Examiner*—Andre J Allen
(74) *Attorney, Agent, or Firm*—Eschweiler & Associates, LLC

(57) ABSTRACT

A device for testing a pressure sensor having a pressure-sensitive region includes a fixture for a pressure sensor designed to receive the pressure sensor, a nozzle designed to generate a gas flow interacting with the pressure-sensitive region of the pressure sensor and positioned so close to the fixture such that the nozzle does not contact the pressure-sensitive region of the pressure sensor and a predefined portion of the pressure-sensitive region experiences an increased or decreased pressure relative to ambient pressure which is constant within a deviation of 10% relative to a pressure mean value, and a measurer designed to measure an electrical signal received by the pressure sensor.

27 Claims, 13 Drawing Sheets detail B

CONCEPT FOR TESTING A PRESSURE SENSOR AND A NOZZLE

PRIORITY

This application claims priority from German Patent Application No. 10 2005 045 079.2, filed on Sep. 21, 2005, and is incorporated herein by reference in its entirety.

TECHNICAL FIELD

The present invention relates to a concept for testing a pressure sensor and to a nozzle.

BACKGROUND

Pressure sensors are increasingly used in safety-relevant applications in automobile electronics. The pressure sensors here, for example, serve for measuring a tire pressure to recognize tire deficiencies at an early time and prevent possible accidents as a result of a bursting tire. Thus, reliable test of pressure sensors used in tires are necessary before delivering same to be able to use them in safety-relevant applications.

Pressure sensors on the wafer level are conventionally tested such that a wafer test having a probe card is placed on the pressure sensor so that a pressure-sensitive portion of the pressure sensor is surrounded by a sealing lip of the wafer tester. Thus, a pressure chamber forms above the pressure sensor. In the pressure chamber, a predetermined pressure may be set in the pressure-sensitive portion at the pressure sensor, and thereupon an output signal generated by the pressure sensor can be received and evaluated by the wafer tester.

This procedure is of disadvantage in that placing the sealing lip on the wafer requires high positioning precision and damage to the wafer may occur if this high positioning precision cannot be kept. Thus, handling and/or positioning of the movable part, namely of the wafer tester, is very complicated and, in particular, very time-consuming.

SUMMARY

A device for testing a pressure sensor may allow easier and cheaper testing of the pressure sensor, and a method for testing a pressure sensor which may be performed in an easier and cheaper manner. According to an embodiment, a device for testing a pressure sensor having a pressure-sensitive region is provided, wherein the device has a fixture for a pressure sensor designed to receive the pressure sensor, a nozzle designed to generate a gas flow interacting with the pressure-sensitive region of the pressure sensor and positioned so close to the fixture such that the nozzle does not contact the pressure-sensitive region of the pressure sensor inserted and a predetermined portion of the pressure-sensitive region experiences an increased or reduced pressure compared to ambient pressure which is constant within a deviation of 10% relative to a pressure mean value, and measuring means designed to measure an electrical signal received from the pressure sensor.

BRIEF DESCRIPTION OF THE DRAWINGS

Preferred embodiments of the present invention will be detailed subsequently referring to the appended drawing, in which.

DETAILED DESCRIPTION

Figure 1A:
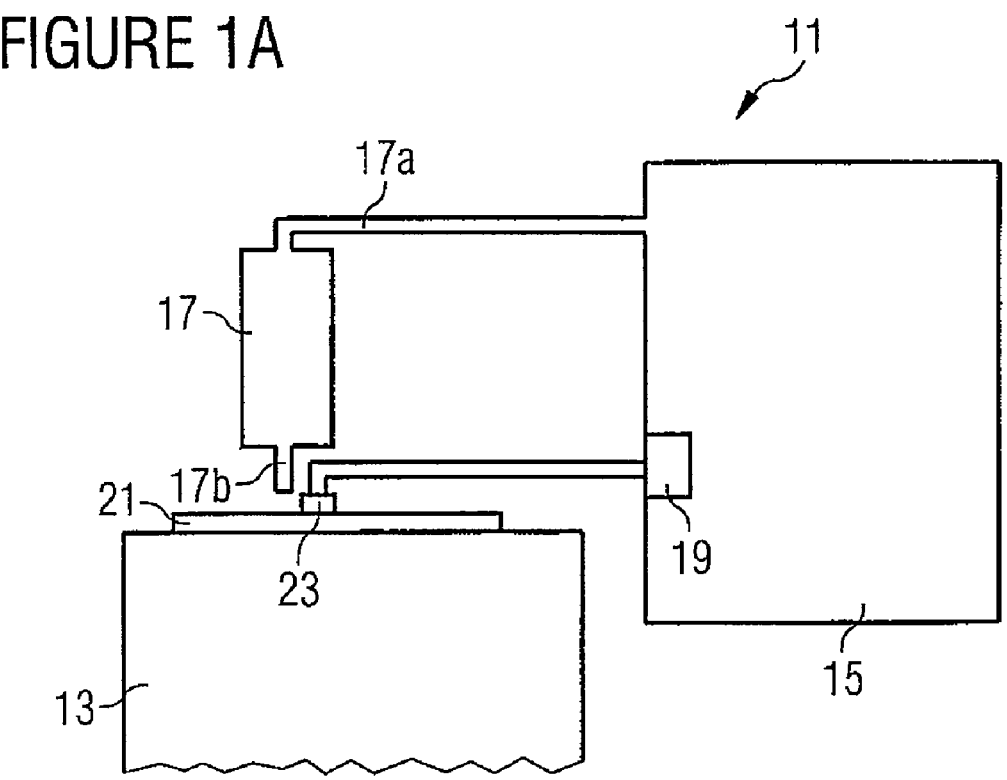
FIG. 1a shows a device for testing a pressure sensor according to an embodiment.

In accordance with another embodiment, a method is provided for testing a pressure sensor having a pressure-sensitive region, wherein the method has the steps of generating a gas flow interacting with the pressure-sensitive region of the pressure sensor, and measuring an electrical signal provided by the pressure sensor, wherein the step of generating has positioning the nozzle close to the pressure-sensitive region so that the nozzle does not contact the pressure-sensitive region, so that a predefined portion of the pressure-sensitive region experiences an increased or reduced pressure relative to ambient pressure which is constant within a deviation of 10% relative to a pressure mean value.

In accordance with another embodiment, a nozzle may have a continuous flow region arranged between an external wall and a core region of a pipe and may be designed to guide a gas flow to an outlet opening of the nozzle or guide same away from the outlet opening of the nozzle, wherein the core region and the external wall are along the pipe and are formed of a solid material so that the gas flow cannot propagate within same, and the core region has a hole designed to adjust a pressure in a pressure-measuring chamber which is at least partly arranged in a recess in the core region to a pressure at the outlet opening.

Firstly, the present invention is based on the finding that a nozzle generating a gas flow can be positioned in the vicinity of a pressure-sensitive region of a pressure sensor without contacting the pressure-sensitive region so that the result is an increased or decreased pressure relative to ambient pressure in a predefined portion of a pressure-sensitive region, the pressure being constant within a deviation of 10% of the pressure mean value.

Secondly, the present invention is based on the finding that, in a nozzle comprising a continuous flow region between an external wall and a core region which are both formed of a solid material, a pressure in a pressure chamber which is at least partly arranged in a recess in the core region may be adjusted to the pressure at the outlet opening via a hole connecting an outlet opening of the nozzle to the pressure-measuring chamber.

A device for testing a pressure sensor generates, via a nozzle from which a gas is discharged, a dynamic pressure which is higher than ambient pressure in a pressure-sensitive region of a pressure sensor, or a gas flow enters the outlet opening of the nozzle so that a lower pressure than ambient pressure forms in a pressure-sensitive region of the pressure sensor. In both cases, an electrical signal provided by the pressure sensor which is received by measuring means in the device for testing can be evaluated. With the help of the signal provided by the pressure sensor, the measuring means can draw conclusions to the quality of the pressure sensor tested.

It can be of advantage with the device for testing a pressure sensor that a pressure when measuring pressure sensors is provided in a simple manner without contacting parts, such as, for example, stamps or a sealing lip, with a surface of the pressure sensor. Thus, damage to a surface of the pressure sensor may be avoided. This is of particular advantage when the pressure sensor, like in one embodiment, is applied onto a wafer. Here, contaminations by emerging silicon oils which are exemplarily used as sealants in conventional test devices can be avoided by employing the device for testing the pressure sensor. Additionally, mechanical wafer damage occurring as a consequence of the contact pressure in conventional devices for testing a pressure sensor can be avoided so that a yield or production yield is increased when testing a pressure sensor. Put differently, rejected pressure sensors arranged on a wafer are reduced as a consequence of reduced mechanical wafer damage.

Thus, rejection costs which, for example, result from mechanical damage of the pressure sensors can be reduced by a device for testing a pressure sensor. Thus, at the same time the manufacturing costs for pressure sensors and, in particular, the testing costs of the pressure sensors can be reduced.

Furthermore, a pressure generated by a nozzle can be determined more easily by means of a nozzle. Thus, a pressure-measuring chamber being in pressure communication to a region around the outlet opening of the nozzle via a hole in the core region, can be arranged in a nozzle formed between an external wall region and a core region which both comprise a solid material in a recess formed in the core region. A pressure sensor can be arranged in the pressure-measuring chamber. Thus, a pressure at the outlet opening of the nozzle may be determined easily without positioning a separate pressure sensor in the vicinity of the outlet opening. Instead, the pressure sensor may be positioned in the pipe where, in one embodiment, an annular clearance nozzle is formed. Thus, the hole in the core region between the pressure-measuring chamber and the outlet opening of the nozzle allows improved pressure-communication between the pressure-measuring chamber and the outlet opening. Thus, pressures in the vicinity of an outlet opening of a nozzle can be determined more precisely.

FIG. 1 shows a schematic view of a device 11 for testing a pressure sensor. The device 11 for testing a pressure sensor comprises a measuring table 13, a tester 15, a pressure vessel 17 and electrical evaluating means 19.

A wafer 21 with a pressure sensor is arranged on the measuring table 13. A probe card 23 which is connected to the electrical evaluating means 19 in an electrically conducting manner is applied onto the wafer 21. A gas flow is supplied to the pressure vessel 17 via a pressure supply line 17a from the tester 15. The gas flow supplied to the pressure vessel 17 exits the pressure vessel via the outlet nozzle 17b and reaches a pressure-sensitive region of the pressure sensor arranged on the wafer 21.

Figure 1B:
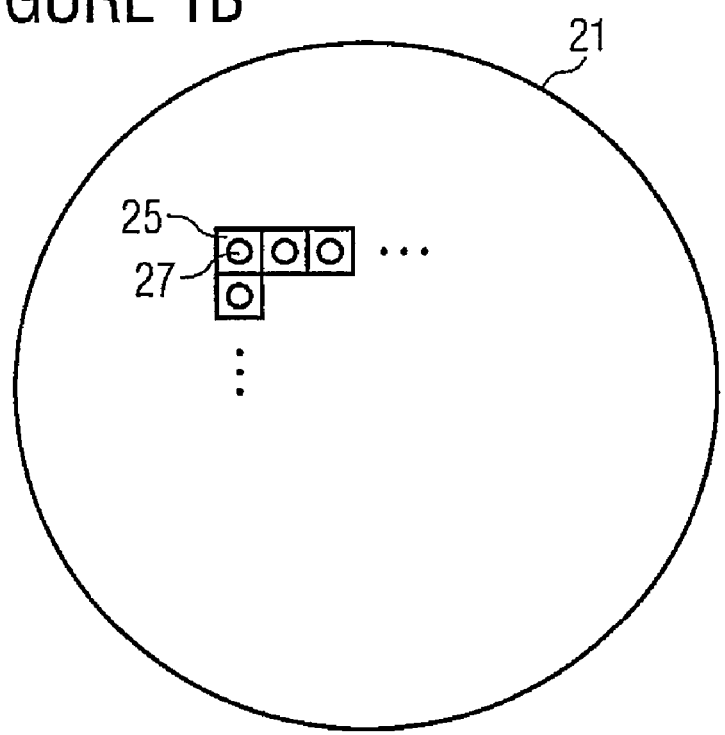
FIG. 1b is a top view of a wafer with a pressure sensor.

FIG. 1b discusses a top view of the wafer 21. Pressure sensor chips 25 having a pressure-sensitive region 27 can be recognized. The pressure sensor chips 25 are arranged next to one another on the wafer 21 and are mechanically connected to one another.

The outlet nozzle 17b is preferably positioned such that it is arranged opposite the pressure-sensitive region 17 of the pressure sensor chip 25, wherein the external dimensions of the outlet nozzle 17b are preferably greater than the dimensions of the pressure-sensitive region 27. Thus, an area of an outlet opening of the outlet nozzle is preferably greater than an area of the pressure-sensitive region 27. At the same time, the outlet nozzle 17b does not contact the pressure-sensitive region 27 of the pressure sensor chip 25.

A dynamic pressure forms in the pressure-sensitive region 27 by a gas flow in the pressure-sensitive region 27 on the wafer 21 exiting the outlet nozzle 17b. Thus, the dynamic pressure is greater than the ambient pressure at the device 11 for testing a pressure sensor. Here, the dynamic pressure depends on the pressure in the pressure vessel 17, the external dimensions of the outlet nozzle 17b and the distance between the wafer 21 and the outlet opening of the outlet nozzle 17b. The higher the pressure in the pressure vessel 17, the higher the pressure in the pressure-sensitive region 27. Additionally, the pressure in the pressure-sensitive region 27 increases with increasing external dimensions of the outlet nozzle 17b. If the outlet nozzle 17b has the shape of, for example, a cylinder, the pressure in the pressure-sensitive region increases with an increasing radius of the circular outlet opening from the outlet nozzle 17b. At the same time, the pressure in the pressure-sensitive region 27 decreases with an increasing distance from the outlet opening of the outlet nozzle 17b to a surface of the wafer 21. Expressed differently, a pressure in the pressure-sensitive region 27 decreases with an increasing distance from the outlet opening of the outlet nozzle 27 to the pressure-sensitive region 27.

It is important when generating the pressure in the pressure-sensitive region 27 for testing a pressure sensor that the pressure in the pressure-sensitive region 27 has a homogenous distribution. The pressure in the pressure-sensitive region thus is constant within a deviation of 10% from a pressure mean value. The homogenous distribution of the pressure here depends on the external dimensions of the outlet nozzle 17b. The external dimensions of the outlet nozzle 17b or the area of the outlet opening here is preferably greater than the area of the pressure-sensitive region.

If the outlet nozzle 17b has the shape of a cylinder and the pressure-sensitive region 27 of the pressure sensor chip 25 is circular, the radius of the cylinder-shaped outlet nozzle 17b will preferably be greater than the radius of the pressure-sensitive region 27. In addition, the homogenous pressure distribution depends on a ratio of the distance from the outlet opening of the outlet nozzle 17b to the pressure-sensitive region 27 to a radius of the outlet nozzle 17b or a radius of the outlet opening of the outlet nozzle 17b. Here, the homogenous pressure distribution is the better, i.e. the deviations of the pressure value from the mean pressure value in the pressure-sensitive region 27 are the lower, the lower the ratio of the distance between the outlet nozzle and the pressure-sensitive region to the radius of the outlet opening.

The pressure distributions at a wafer and, in particular, in a pressure-sensitive region 27 of a pressure sensor chip 25 with a cylinder-shaped outlet nozzle 17b will be discussed subsequently.

FIGS. 2a-d show respective simulation results having been established for a stationary flow from a nozzle. It is assumed for the simulations that the nozzle is directed to a planar wafer. The simulations here are performed in a two-dimensional axially symmetrical geometry. Thus, a pressure distribution in a pressure-sensitive region, i.e. here approximately in a range of a radius of less than 0.7 mm, is examined in greater detail. The goal of the simulation is to establish the boundary conditions below which the pressure in the pressure-sensitive region varies by less than 0.1%. The length of the outlet nozzle 17b here is, for example, about 40 mm and it has been assumed for the gas employed in the simulation that this is a fluid, such as, for example, air. Possible turbulences occurring when generating the pressure in the pressure-sensitive region are simulated by means of a k-e model.

Figure 2A:
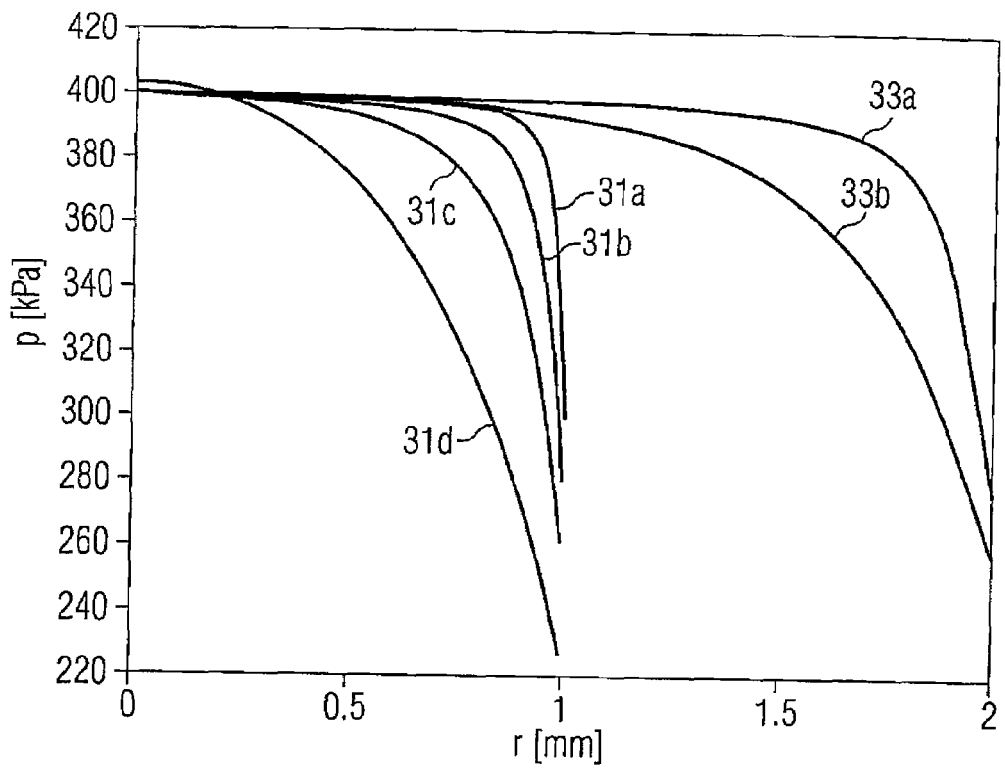
FIG. 2a shows a pressure distribution in a pressure-sensitive region of a pressure sensor tested by a device with a pipe nozzle.

FIG. 2a shows a course of the pressure at the wafer and in the pressure-sensitive region 27. The pressure curve here is shown in dependence on a distance from a center of the circular pressure-sensitive region 27. Thus, a value of the pressure is illustrated in dependence on the respective position in the pressure-sensitive region where the pressure occurs. A radius or a distance from the symmetry axis or the center of the pressure-sensitive region in mm is plotted on the x axis, whereas the pressure in Pascal or Pa is plotted on the y axis.

Graphs 31a-31d discuss a course of the pressure in the pressure-sensitive region 27 for different distances between the outlet opening of a first pipe nozzle and the pressure-sensitive region. The first pipe nozzle has an internal radius of 1 mm and a wall thickness of 0.5 mm so that an external radius of the first pipe nozzle of 1.5 mm results. The pressure at the inlet into the first pipe nozzle in the simulations is $4 \times 10^5$ Pa. Curve 31a here discusses a course for a distance from the pressure-sensitive region 27 to the outlet opening of the first pipe nozzle of about 0.05 mm, curve 31b is for a distance of 0.1 mm, curve 31c for a distance of 0.2 mm and curve 31d for a distance of about 0.5 mm.

Curves 33a-33b discuss pressure courses for a second pipe nozzle. The second pipe nozzle has an internal radius of 2.0 mm and a wall thickness of 0.5 mm so that an external radius of the second pipe nozzle of 2.5 mm results. The pressure at the inlet into the second pipe nozzle in the simulations is $4 \times 10^5$ Pa and thus is precisely as high as the pressure at the inlet in the first pipe nozzle.

Curve 33a here discusses the course of the pressure with a distance between the pressure-sensitive region 27 and the outlet opening of about 0.2 mm, whereas curve 33b discusses the pressure course for a distance of about 0.5 mm.

Figure 2B:
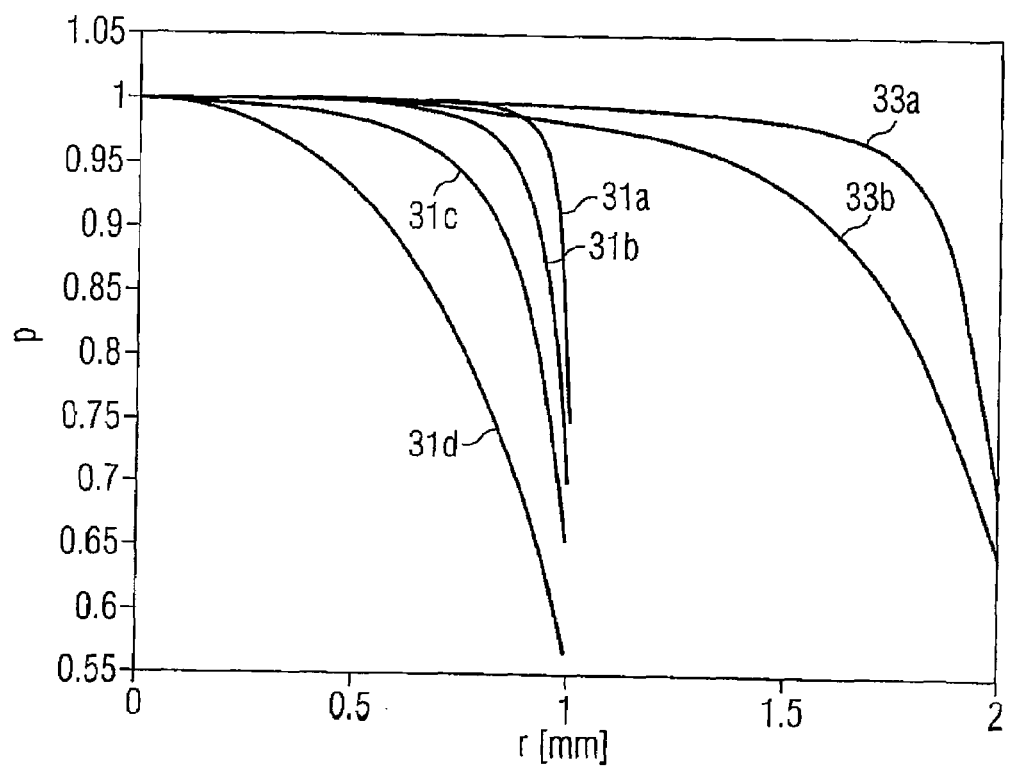
FIG. 2b shows the pressure distribution of FIG. 2a in the pressure-sensitive region, the pressure values being standardized to a pressure maximum in the pressure-sensitive region.

FIG. 2b shows a course of standardized pressure values at the wafer and thus above the pressure-sensitive region 27 for the first pipe nozzle and the second pipe nozzle with different distances from the pressure-sensitive region to the outlet opening. Like in FIG. 2a, the distance from the center of the pressure-sensitive region 27 in mm is plotted on the x axis, whereas a standardized value of the pressure in the pressure-sensitive region 27 is plotted on the y axis. The relative or standardized pressure here is standardized to the maximum value or the value of the pressure with r=0, wherein the highest pressure in the pressure-sensitive region 27 is at the center of the circular pressure-sensitive region 27. Curves 31a-31d again discuss the course of the pressure in the first pipe nozzle, whereas curves 33a-33b discuss the course in the second pipe nozzle.

Figure 2C:
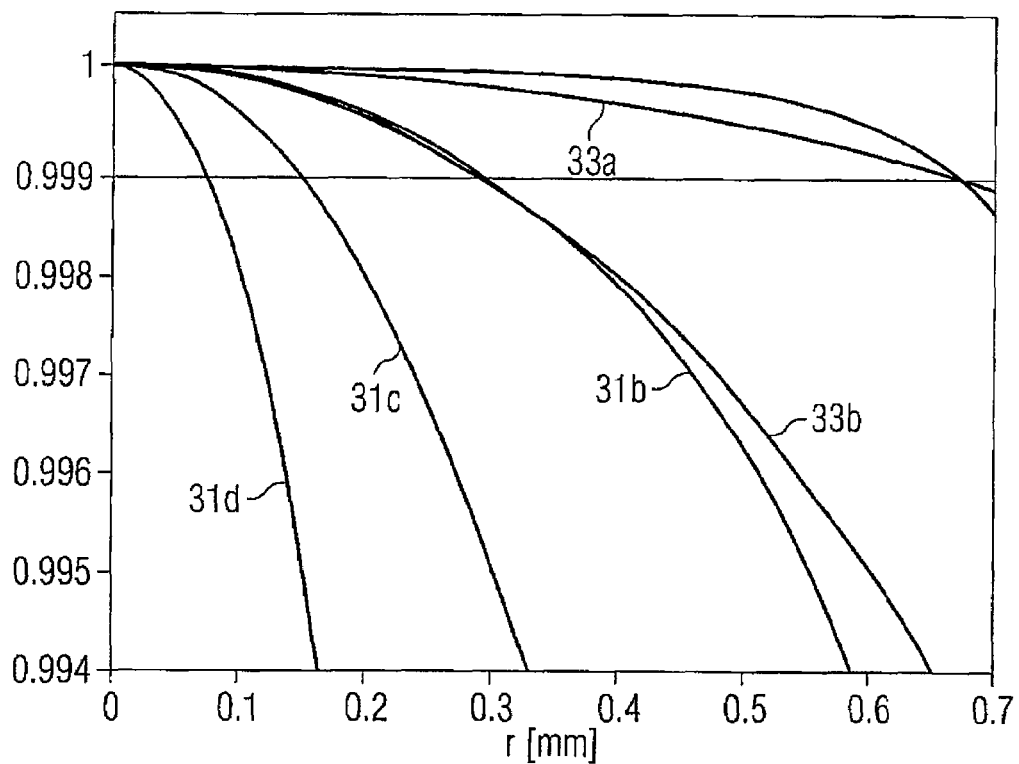
FIG. 2c shows an extraction of the pressure distributions shown in FIG. 2b in the pressure-sensitive region in the vicinity of a tolerance limit.

FIG. 2c discusses an extract of the courses 31a-d, 33a, b of the pressure of FIG. 2b. Thus, the distance from the center of the pressure-sensitive region in mm is again plotted on the x axis, whereas the standardized value of the pressure in the pressure-sensitive region is plotted on the y axis. Here, FIG. 2c in particular discusses the standardized pressure within a range from 0.0994 or 99.4% to 1 or 100%. A limit at 0.99 is indicated in FIG. 2c establishing the maximum value for the allowed deviations of the pressure in the pressure-sensitive region 27 and thus the tolerance in the pressure-sensitive region 27.

FIGS. 2a-c show that, for the two pipe nozzles, the pressure at a radius of 0 or the maximum pressure will only vary slightly if the distance between the pipe nozzle and the wafer or the outlet opening from the pipe nozzle and the pressure-sensitive region 27 changes.

The following contexts apply to the pressure distribution in the pressure-sensitive region 27. In the first pipe nozzle, the pressure in the pressure-sensitive region will vary by less than 0.1% if the distance between the wafer 21 and the nozzle is 0.05 mm or less. If the distance between the first pipe nozzle and the wafer 21 is greater than 0.1 mm, the pressure in the pressure-sensitive region 27 will vary by more than 0.1%.

In the second pipe nozzle, the pressure in the pressure-sensitive region will vary by less than 0.1% if the distance between the wafer 21 and the second pipe nozzle is 0.2 mm or less. If the distance from the second pipe nozzle to the wafer is greater than 0.5 mm, the pressure in the pressure-sensitive region 27 will vary by more than 0.1%.

A measurement of the mass flows through the first pipe nozzle shows that a mass flow of 0.31 g of air per second or 0.31 g/s will occur with a distance of the wafer and the nozzle of 0.05 mm, a flow of 0.63 g/s will occur with a distance of 0.1 mm, and a flow of 1.27 g/s will occur for a distance of 0.2 mm. If the distance between the wafer and the first pipe nozzle is 0.5 mm, the flow or mass flow will even be 2.78 g/s. Thus, it becomes obvious that the mass flow through the pipe nozzle increases with an increasing distance between the wafer and the pipe nozzle.

It can be observed that, with the second pipe nozzle the internal radius of which is higher than the internal radius of the first pipe nozzle, a mass flow of 2.54 g/s will occur with a distance of 0.2 mm and a mass flow of 6.35 g/s will occur with a distance of 0.5 mm. Thus, it becomes obvious that the mass flow increases with an increasing area of the outlet opening or an increasing internal radius of the pipe nozzle.

Figure 2D:
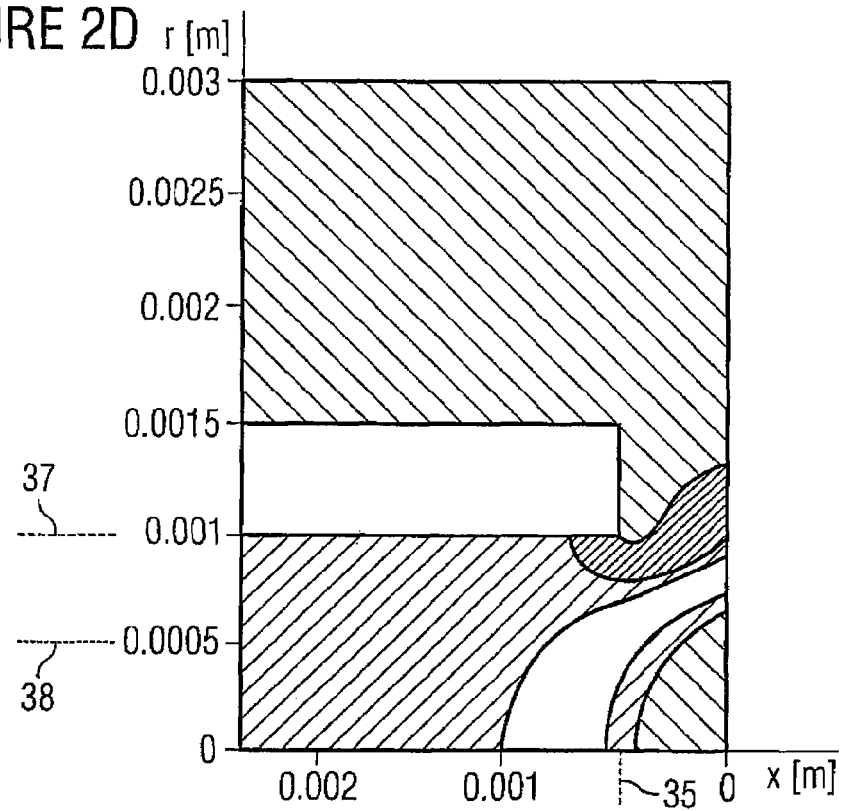
FIG. 2d shows a pressure course at an outlet opening of a nozzle and a wafer with a pressure sensor in a device for testing the pressure sensor.

FIG. 2d discusses a pressure course resulting if the distance between the first pipe nozzle and the wafer 21 is 0.5 mm. The distance from the wafer 21 in meters is plotted on the x axis, whereas the distance from the symmetry axis in the pressure-sensitive region 27 or the distance between the respective point and the center of the pressure-sensitive region in meters is plotted on the y axis. Thus, the wafer is arranged at a position of x=0. Line 35 explains a position of the outlet opening of the first pipe nozzle relative to the x axis, whereas a broken line 37 illustrates the internal radius of the first pipe nozzle. The brighter the regions, the lower the pressure within it.

It becomes obvious from FIG. 2d that a high pressure at the wafer surface appears within the pressure-sensitive region 27 illustrated by a dotted line 38, whereas the zones of lower pressures extend towards the wafer edge. At the same time, it shows that the lower pressure zones also extend beyond the outlet opening of the first pipe nozzle so that different pressure values will also result within the first pipe nozzle in dependence on the distance from the symmetry axis or the center.

Figure 3A:
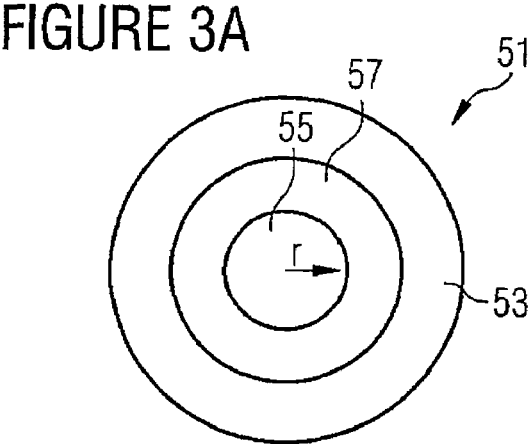
FIG. 3a is a top view of an outlet opening of an annular clearance nozzle.

The subsequent FIGS. 3a-f explain a pressure distribution at an annular clearance nozzle. FIG. 3a shows a top view of an annular clearance nozzle 51. The annular clearance nozzle 51 comprises an external wall region 53 and a core region 55. Both the external wall region 53 and the core region 55 are formed of a solid material. A nozzle clearance 57 which has a cylinder-ring shape as does the external wall region 53 is arranged between the external wall region 53 and the core region 55.

Subsequently, the behavior of two annular clearance nozzles, of an annular clearance nozzle R1 and an annular clearance nozzle R2, will be compared referring to simulations. Here, in particular, the pressure distribution in the pressure-sensitive region 27 will be explained when the outlet nozzle 17b in the device 11 is formed as an annular clearance nozzle. This behavior is, among other things, examined by a distance r from the center of the annular clearance nozzle. Here, it is assumed that the annular clearance nozzle and the pressure-sensitive region are arranged in a mutually concentric manner.

The first cylinder-shaped annular clearance nozzle R1 examined has a core radius of 0.75 mm and a thickness or width of the nozzle clearance 55 or a clearance thickness of 0.25 mm. The air clearance of the first annular clearance nozzle R1 thus extends from a radius r=0.75 mm to a radius r=1 mm or is in a distance range from the center of the core region between 0.75 mm and 1 mm. Furthermore, the first annular clearance nozzle R1 has a wall thickness of 0.5 mm so that an external radius of 1.5 mm results. Thus, a pressure of $6 \times 10^5$ Pa at the inlet of the first annular clearance nozzle R1 is assumed for the simulations.

In addition, the behavior of the second annular clearance nozzle R2 having a radius of the core region 55 or a core radius of 1.75 mm is examined. The second annular clearance nozzle R2 additionally has a thickness of the nozzle clearance 57 or a clearance thickness of 0.25 mm so that an air gap extends from a radius value r=1.75 mm to a radius value r=2 mm or is within a distance range from the center of the core region between 1.75 mm and 2 mm.

The second annular clearance nozzle R2 here has a wall thickness of 0.5 mm, as does the first annular clearance nozzle R1, so that the result is an external radius of the second annular clearance nozzle R2 of 2.5 mm. In these simulations, the pressure at the inlet position of the second annular clearance nozzle R2 is set to a value of $9 \times 10^5$ Pa.

Figure 3B:
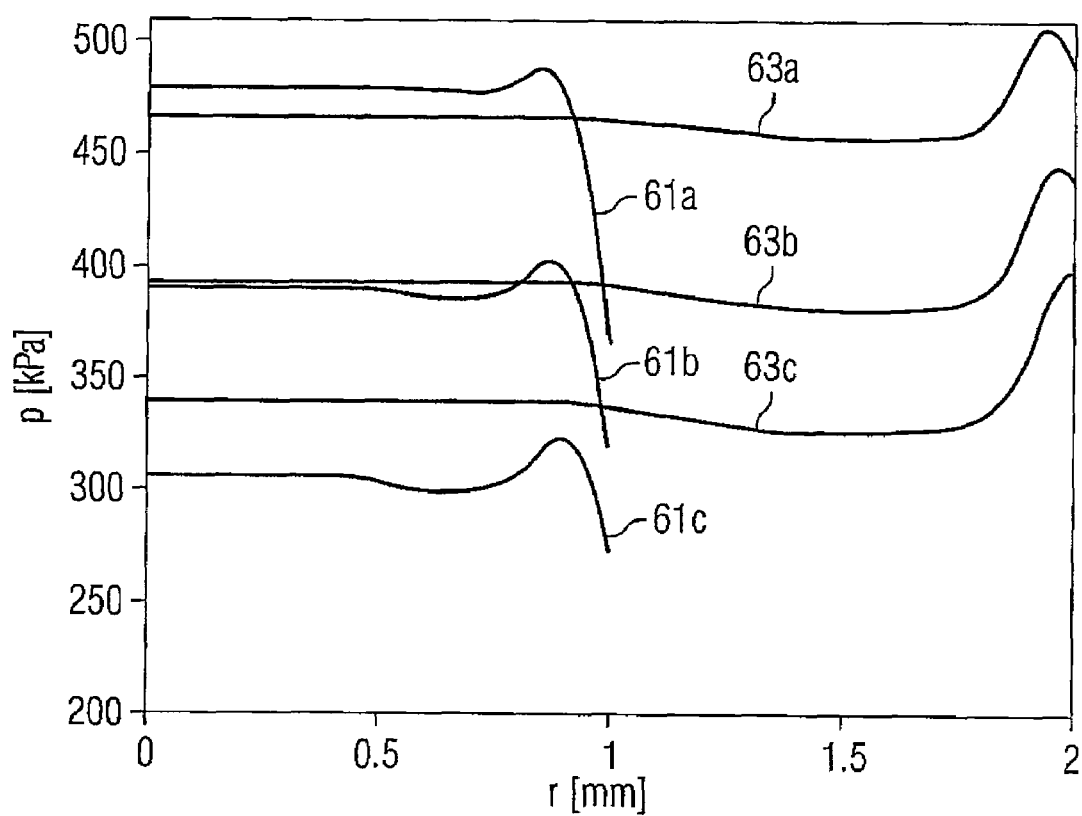
FIG. 3b shows a course of a pressure in a pressure-sensitive region of a pressure sensor tested by a device for testing a pressure sensor according to an embodiment having an annular clearance nozzle.

FIG. 3b discusses the pressure courses at the wafer and in the pressure-sensitive region 27 if the pressure is generated via the annular clearance nozzles R1, R2. Thus, the distance R from the center of the circular pressure-sensitive region 27 in mm is plotted on the x axis, whereas the pressure in Pascal or Pa is plotted on the y axis. Curves 61a-61c discuss the pressure distributions in the pressure-sensitive region 27 if the pressure is generated by means of the first annular clearance nozzle R1. Curve 61a discusses a pressure distribution in the pressure-sensitive region 27 with a distance between the pressure-sensitive region 27 and the outlet opening of the first annular clearance nozzle R1 of 0.15 mm, whereas curve 61b illustrates the pressure course for a distance of 0.2 mm and curve 61c illustrates a course of the pressure for a distance of 0.25 mm.

Curves 63a-c show a course of the pressure in the pressure-sensitive region 27 when the second annular clearance nozzle R2 is used for generating a pressure in the pressure-sensitive region 27. Curve 63a discusses a course of the pressure in the pressure-sensitive region if the distance between the wafer and the outlet opening of the second annular clearance nozzle R2 or the distance between the wafer and the second annular clearance nozzle is 0.35 mm, whereas curve 63b shows a course of the pressure for a distance of 0.40 mm and curve 63c shows a course of the pressure for a distance of 0.45 mm.

It becomes obvious from FIG. 3b that the value of the pressure in the pressure-sensitive region decreases with an increasing distance between the wafer 21 and the outlet nozzle or the annular clearance nozzle R1, R2.

Figure 3C:
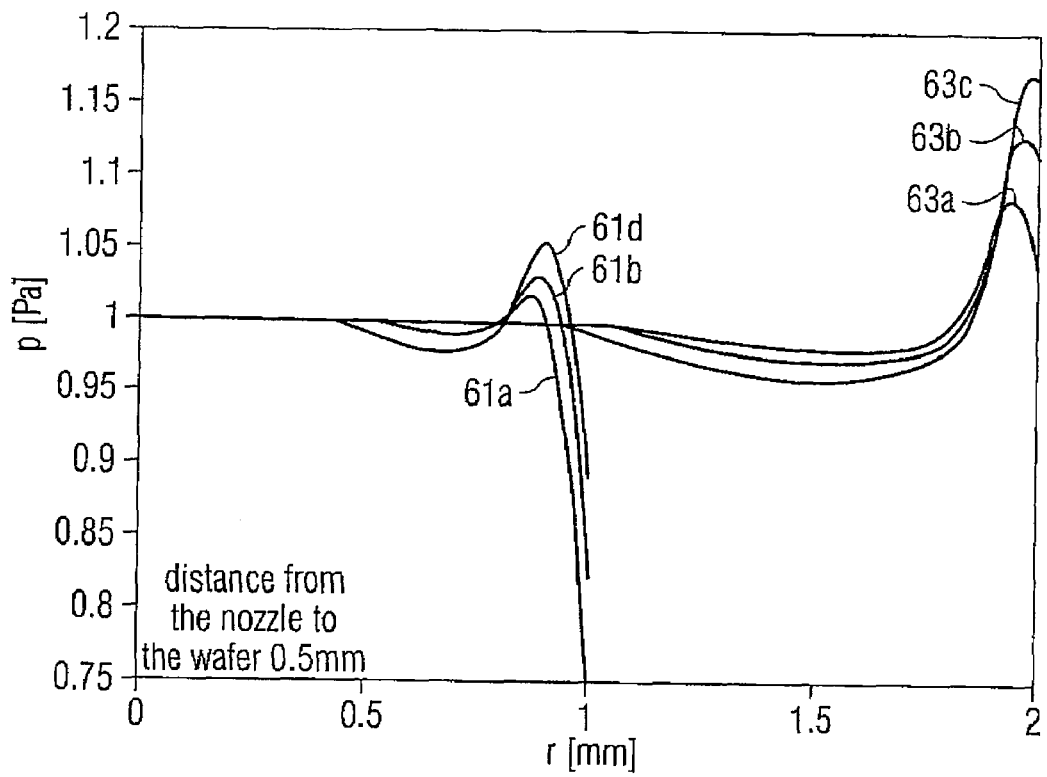
FIG. 3c shows the pressure distribution shown in FIG. 3b, the pressure values being standardized to a maximum value in the pressure-sensitive region.

FIG. 3c illustrates the courses shown in the curves 61a, 61b, 61d, 63a-63c of the pressure at the wafer and in the pressure-sensitive region in the annular clearance nozzles R1, R2 so that the pressures are each standardized to the pressure at r=0 or at the center of the circular pressure-sensitive region. Here, the radius r or the distance from the center of the pressure-sensitive region in mm is plotted on the x axis, whereas the value of the standardized pressure is plotted on the y axis. Curve 61d explains a course of the pressure in the pressure-sensitive region 27 if the pressure is generated by the first annular clearance nozzle R1 and the distance between the pressure-sensitive region 27 and the outlet opening of the first annular clearance nozzle R1 is about 0.5 mm.

Figure 3D:
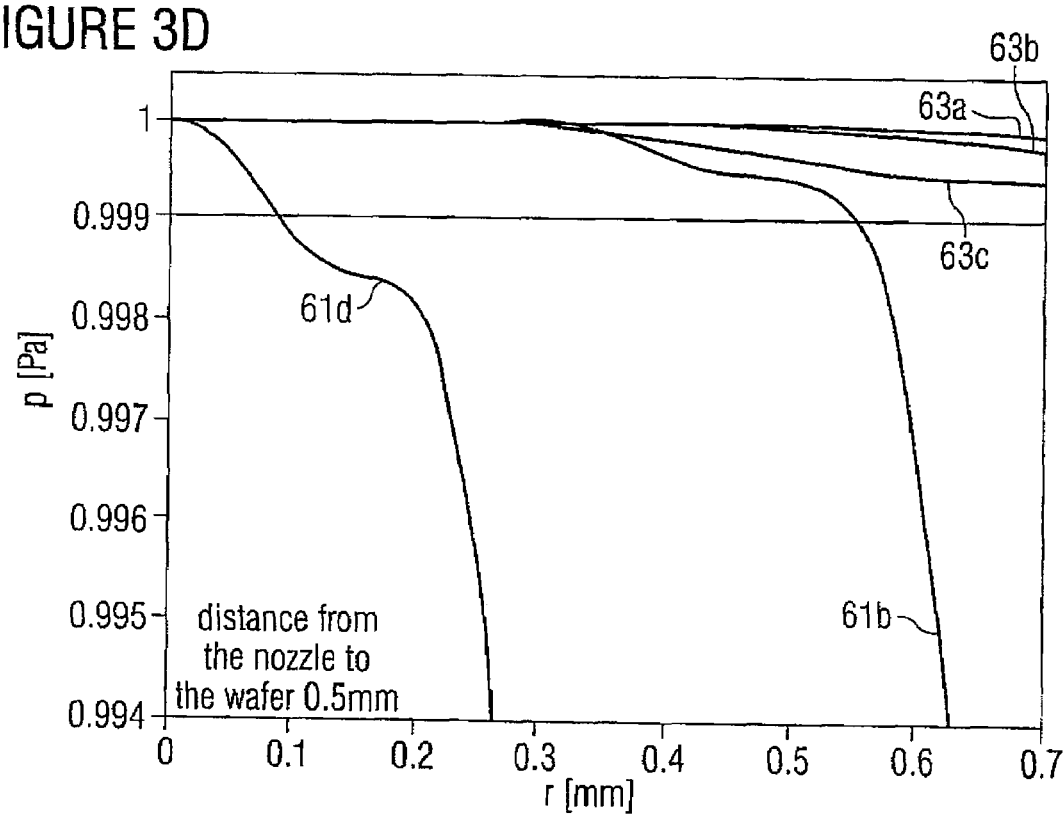
FIG. 3d shows an extract of the course shown in FIG. 3c of the pressure values in the vicinity of a tolerance limit.

FIG. 3d shows an extract from the diagram shown in FIG. 2c. Thus, the distance from the center of the pressure-sensitive region 27 in mm is plotted on the x axis, whereas the standardized value of the pressure is plotted on the y axis. Like in FIG. 2c, the pressure distribution in the pressure-sensitive region at r<0.7 mm is illustrated in greater detail. At the same time, a tolerance limit of 0.1% at a standardized pressure value of 0.999 is illustrated by a continuous line.

In becomes obvious from the course illustrated in FIGS. 3b-d that the absolute values of the pressure in the pressure-sensitive region vary considerably with the distance from the wafer 21 to the annular clearance nozzle R1, R2. A simulation of the pressure sensitivity or the deviations of the pressure in the pressure-sensitive region from the pressure at the center in dependence on the distance from the wafer to the annular clearance nozzles shows that the following applies for the two annular clearance nozzles R1, R2 with an allowed deviation of 0.1% or an allowed pressure tolerance of 0.1%.

If the pressure in the pressure-sensitive region 27 is generated by the first annular clearance nozzle R1, the required tolerance or maximum deviation of 0.1% for a distance from the nozzle to the wafer will not yet be obtained at a distance value of 0.5 mm, but the required tolerance is obtained at a distance of 0.2 mm. However, for the second annular clearance nozzle R2 it applies that the required tolerance or maximum deviation is already obtained at a distance of 0.45 mm from the annular clearance nozzle R2 to the wafer 21.

Thus, it shows that the required tolerance may already be kept to at a greater distance from the wafer 21 to the nozzle if the external radius of the nozzle clearance 55 is designed to be correspondingly high. The pressure deviations in the pressure-sensitive region 27 here are, as has already been discussed, dependent on the radius of the core region 55, the radius of the external wall region 53 and the distance between the wafer 21 and the annular clearance nozzle R1, R2.

Figure 3E:
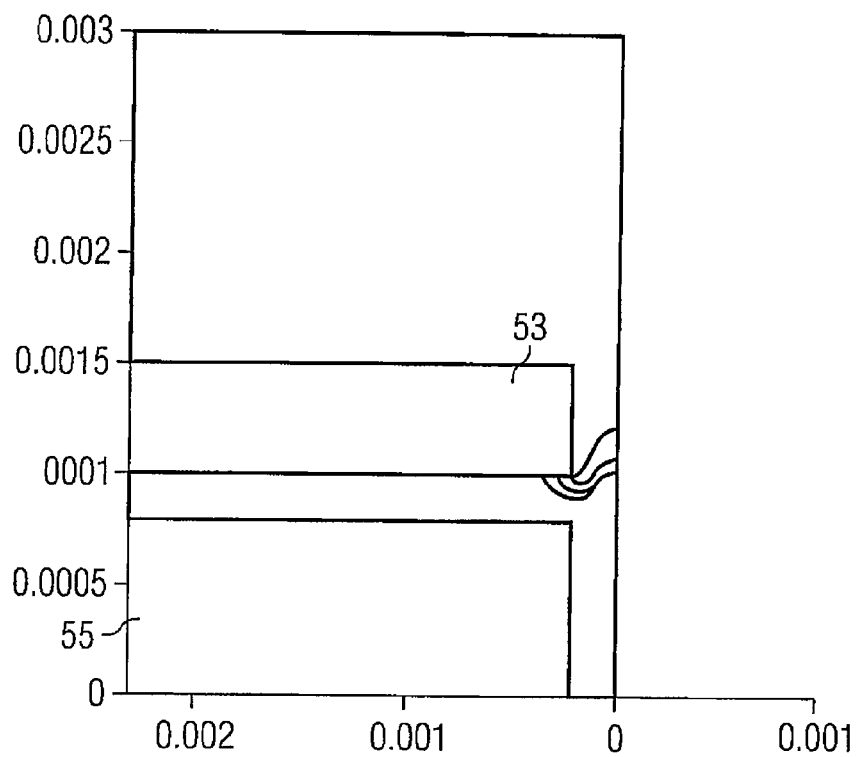
FIG. 3e shows a pressure distribution at an outlet opening of an annular clearance nozzle having an external radius of 1 mm and at a pressure sensor arranged on a wafer in the vicinity of the outlet opening.

FIG. 3e shows a pressure distribution in a region at the first annular clearance nozzle R1 and the wafer 21. Here, a distance to the wafer 21 arranged at an x value of zero in m is plotted on the x axis, whereas the distance from the symmetry axis of the first annular clearance nozzle R1 or the center of the core region in m is plotted on the y axis. In the simulation shown here, the distance between the wafer and the outlet opening of the annular clearance nozzle R1 is assumed to be 0.2 mm.

The two continuous white blocks here show the external wall region 53 and the core region 55 of the annular clearance nozzle R1. The region between the two white blocks discusses the pressure course in the nozzle clearance 57 of the first annular clearance nozzle R1. Again, it applies for the courses in the pressure zones that the pressure in the zones is the smaller, the brighter the respective zones are in the illustration. Thus, it becomes obvious from FIG. 3e that some zones where the pressure is lower form in the vicinity of the external wall of the annular clearance nozzle 1, i.e. at a y value of 0.1. The lower pressure zones form by the gas discharge from the annular clearance nozzle to the outside and the accompanying reduction in the static pressure in this region. This gas discharge thus results in a reduction in the dynamic pressure in the region between the first annular clearance nozzle R1 and the wafer 21.

Figure 3F:
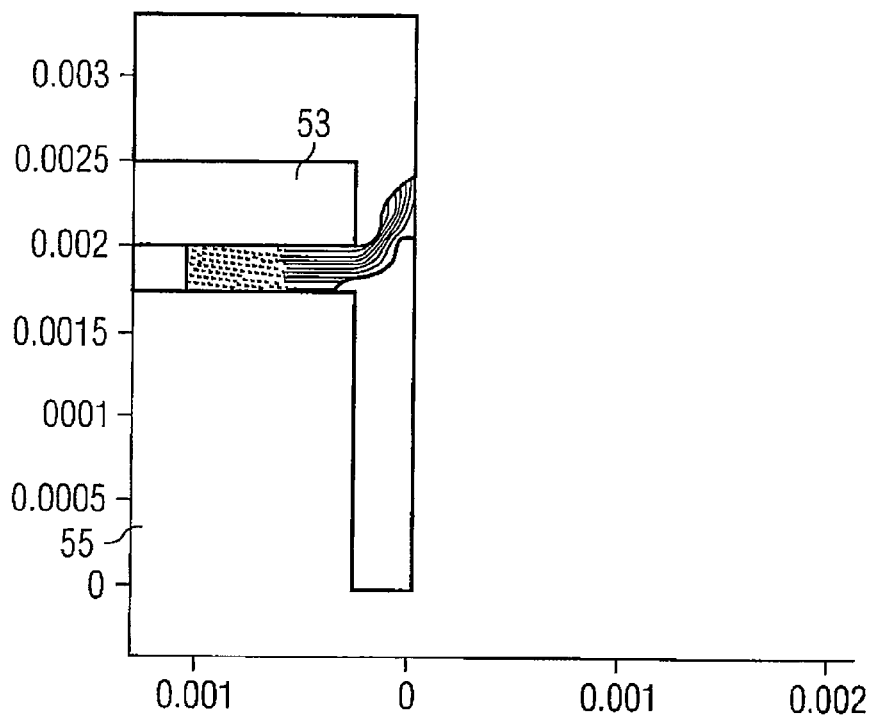
FIG. 3f shows a pressure distribution at an outlet opening of an annular clearance nozzle having an external radius of 2 mm and at a pressure sensor arranged on a wafer in the vicinity of the outlet opening.

FIG. 3f discusses a pressure distribution in a region at the wafer 21 and the second annular clearance nozzle R2. Again, a distance from the wafer 21 in a direction towards the annular clearance nozzle R2 in m is plotted on the x axis, whereas a distance from the symmetry axis or the cylinder axis of the second annular clearance nozzle R2 in m is plotted on the y axis. The distance between the outlet opening of the annular clearance nozzle R2 and the wafer in the simulations is assumed to be 0.35 mm.

The external wall region 53 and the core region 57 again become obvious from the white blocks. A pressure course in the nozzle clearance 57 is illustrated between the two white blocks.

In FIG. 3f, too, it applies that the pressure is the smaller, the brighter the respective zones illustrated are. Due to the relatively great distance between the wafer 21 and the second annular clearance nozzle R2, zones of different pressures already form in the nozzle clearance 57. It is striking in the pressure distribution shown in FIG. 3f that a low pressure zone extends over the outlet opening from the nozzle clearance 57 into the region between the annular clearance nozzle and the wafer, wherein the cross-section of the zone at the beginning decreases with an increasing distance from the outlet opening. In this context, we speak of detachment of the flow from the nozzle. This will be explained in greater detail below.

Figure 4:
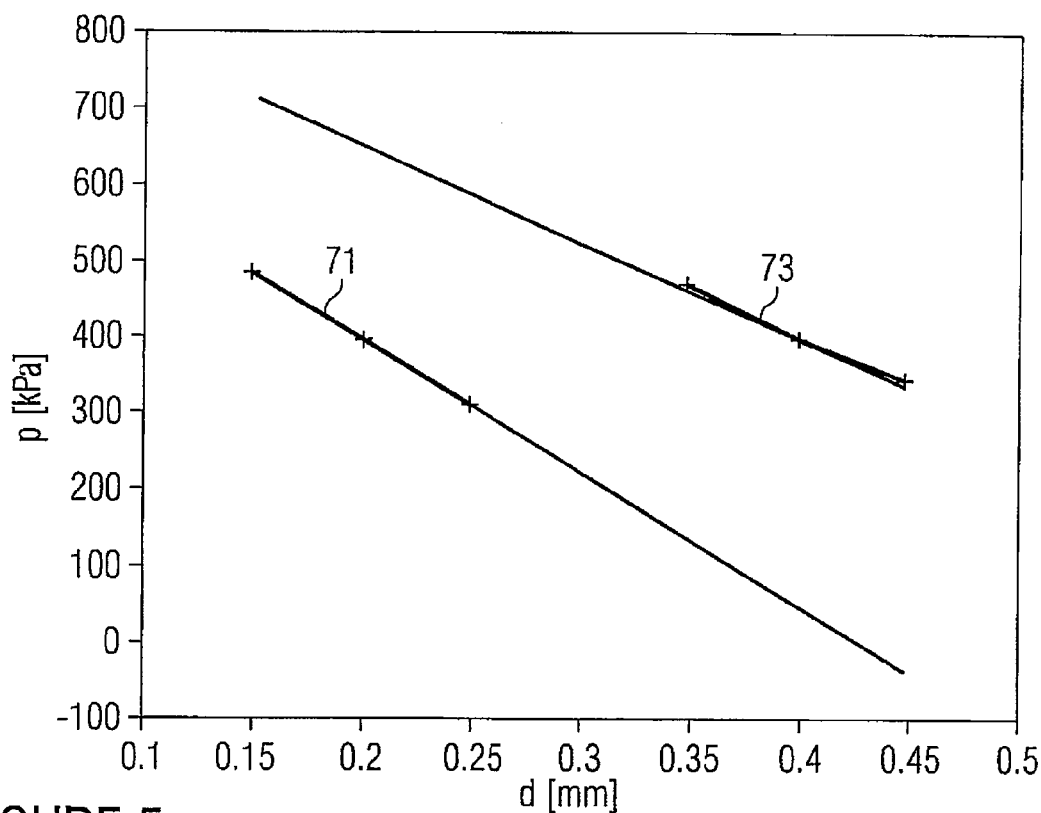
FIG. 4 shows a context between a pressure at a pressure sensor and a distance from the pressure sensor to an outlet opening of an annular clearance nozzle for an annular clearance nozzle having an external radius of 1 mm and for an external radius of 2 mm.

FIG. 4 explains a context between the maximum pressure in the pressure-sensitive region 27 in the center of the circular pressure-sensitive region 27 in dependence on a distance between the wafer 21 and the two annular clearance nozzles R1, R2. Here, the distance between the annular clearance nozzles R1, R2 and the wafer 21 is plotted on the x axis, whereas the pressure in the center of the pressure-sensitive region at r=0 in Pascal or Pa is plotted on the y axis. The pressure at r=0 here corresponds to a maximum pressure in the pressure-sensitive region 27. Curve 71 discusses a course of pressure maximum values for the first annular clearance nozzle R1, whereas curve 73 discusses a course of pressure maximum values for the second annular clearance nozzle R2. It becomes obvious from curves 71, 73 that the pressure in the center of the pressure-sensitive region 27 or maximum pressure decreases with an increasing distance from the annular clearance nozzle R1, R2.

TABLE 1

| Annular clearance nozzle 1 | | Annular clearance nozzle 2 | |
| --- | --- | --- | --- |
| d/mm | P/Pa | d/mm | p/Pa |
| 0.15 | 479445 | 0.35 | 464959 |
| 0.20 | 389797 | 0.40 | 392147 |
| 0.25 | 306513 | 0.45 | 339311 |
| P(d) = 9e5 Pa − d * 12.6e5 Pa/mm (1) | | P(d) = 7.4e5 Pa − d * 17.3e5 Pa/mm (2) | |

Table 1 illustrates the simulation results for different distances from the wafer to the first annular clearance nozzle R1 (first annular clearance nozzle=annular clearance nozzle 1) and the second annular clearance nozzle (second annular clearance nozzle=annular clearance nozzle 2). A respective distance from the wafer to the annular clearance nozzle is represented in the left column, whereas the pressure p on the wafer or in the pressure-sensitive region at r=0 is represented in the right column. The pressure at r=0 here corresponds to the maximum pressure in the pressure-sensitive region 27, as has already been discussed above. At the same time, Table 1 shows an equation (1) and an equation (2) from which a maximum value of the pressure in the pressure-sensitive region 27 may be calculated in dependence on the distance to the respective annular clearance nozzle R1, R2. A variable p(d) here stands for the maximum value of the pressure p in dependence on a distance d between the wafer and the nozzle.

Subsequently, it will be discussed how a maximum deviation of the distance between the wafer 21 and the annular clearance nozzle 1 from a set value can be calculated such that the maximum value does not change by more than 0.1%. The sensitivity of the pressure or the deviation of the pressure in dependence on a distance to the first annular clearance nozzle R1 here can be determined according to the following context:

$$(p(d_2)-p(d_1))/p(d_2)<0.001 \quad (3)$$

In equation (3), a variable $p(d_2)$ stands for a maximum pressure value at a value of the distance $d_2$ between the wafer and the first annular clearance nozzle R1 and a variable $P(d_1)$ for a maximum pressure value at the wafer 21 at a value $d_1$ of the distance between the wafer and the first annular clearance nozzle R1.

If equation (1) from Table 1 is inserted into equation (3) and solved according to an allowed variation of the distance or a term $d_2$-$d_1$, the result for a typical value of the distance between the first annular clearance nozzle R1 and the wafer 21 of 0.4 mm will be a value of 0.3 µm for the term $d_2$-$d_1$. This means for the first annular clearance nozzle that the distance, with a distance value ($d_2$=0.4 mm) between the first annular clearance nozzle R1 and the wafer 21, may only vary in a range of less than 0.3 µm if the maximum pressure P(d) may deviate by less than 0.1% from a set value, i.e. is to remain constant within a range of 0.1%.

Figure 5:
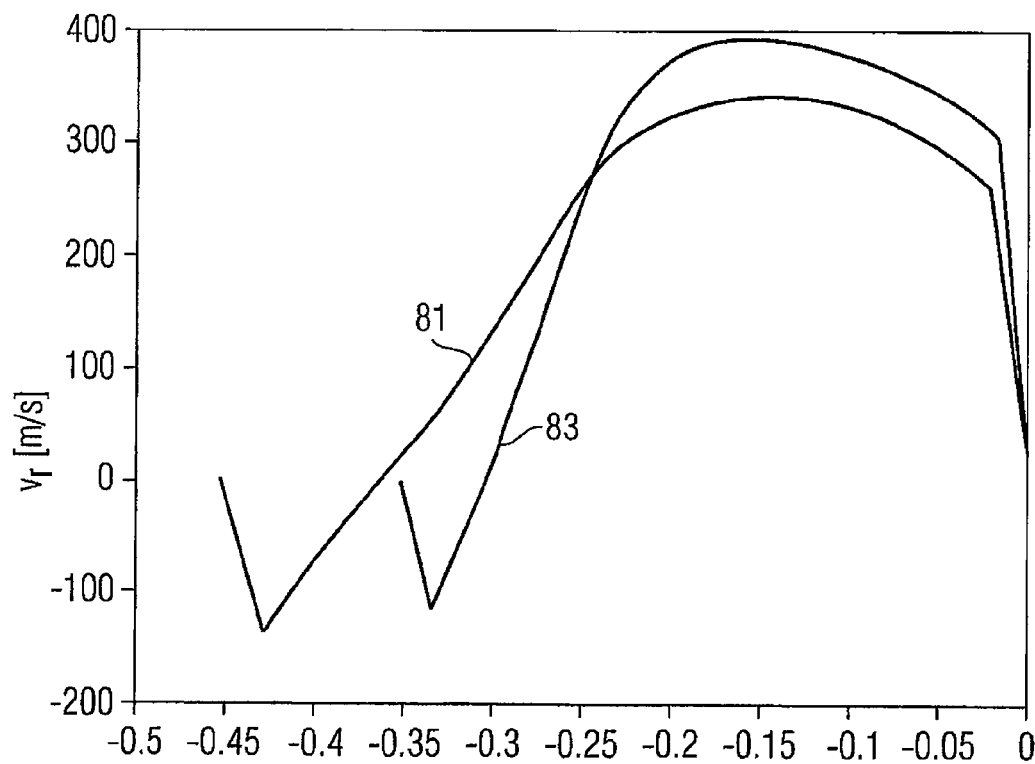
FIG. 5 shows a distribution of a radial flow velocity along a path from a pressure sensor to an outlet opening of a nozzle.

FIG. 5 discusses a course of radial flow velocity $v_r$ for the second annular clearance nozzle R2 at two different distance values between the wafer and the second annular clearance nozzle R2. The distance from the point to the plane in which the outlet opening of the annular clearance nozzle is arranged in mm is plotted on the x axis. Thus, an x value of 0 corresponds to a position at the external wall of the annular clearance nozzle, whereas the values x=−0.35 or x=−0.45 each correspond to a position on the wafer surface. The values of the radial flow velocity in m/s or meters per second are plotted on the y axis.

The values of the radial flow velocity here are determined along a perpendicular to the wafer 21 in a radial distance or distance from the center of the pressure-sensitive region of 2.2 mm. The perpendicular thus extends from the wafer 21 to the external wall region 53 of the second annular clearance nozzle R2. Curve 81 discusses a course of the radial flow velocity $v_r$ at a distance from the second annular clearance nozzle R2 to the wafer of 0.45 mm. Curve 83 discusses a course of the radial flow velocity $v_r$ for a distance between the wafer 21 and the second annular clearance nozzle R2 of 0.35 mm. If the value $v_r$ is greater than zero, the flow will be towards the outside, whereas at a value $v_r$ smaller than zero, the result will be a flow directed to the inside, i.e. towards the center.

It becomes obvious from FIG. 5 that a minimum value of the radial flow velocity decreases with an increasing distance from the wafer 21 to the second annular clearance nozzle R2. Expressed differently, a magnitude of the minimum of the radial flow velocity $v_r$ increases with increasing distance between the wafer 21 and the second annular clearance nozzle R2. Thus, narrowing of the flow area increases with an increasing distance between the wafer 21 and the second annular clearance nozzle R2.

Table 2 discusses with reference to simulation values the effects of the detachment of the flow from the nozzle with an increasing distance from the wafer to the annular clearance nozzle R2.

TABLE 2

| Mass flow f through the annular clearance nozzles | | | |
| --- | --- | --- | --- |
| Annular clearance nozzle 1 | | Annular clearance nozzle 2 | |
| d/mm | f/(g/s) | D/mm | f(g/s) |
| 0.15 | 1.12 | 0.35 | 4.80 |
| 0.20 | 1.26 | 0.40 | 4.73 |
| 0.25 | 1.28 | 0.45 | 4.62 |

In Table 2 values of a mass flow f through the first annular clearance nozzle R1 and the second annular clearance nozzle R2 are illustrated in dependence on a distance from the wafer 21 to the annular clearance nozzles R1, R2. The distance between the wafer and the annular clearance nozzle d here is each indicated in mm or millimeters, wherein a mass flow f through the respective annular clearance nozzle is indicated in grams per second or g/s. It becomes obvious from Table 2 that the mass flow f in the second annular clearance nozzle R2 decreases with an increasing distance from the wafer to the annular clearance nozzle R2. The cause for this is an increasing detachment of the flow from the nozzle with an increasing distance from the wafer to the nozzle, which is discussed in FIG. 5. This results, as has already been mentioned, in narrowing the effective flow area with an increasing distance between the wafer and the nozzle.

Figure 6A:
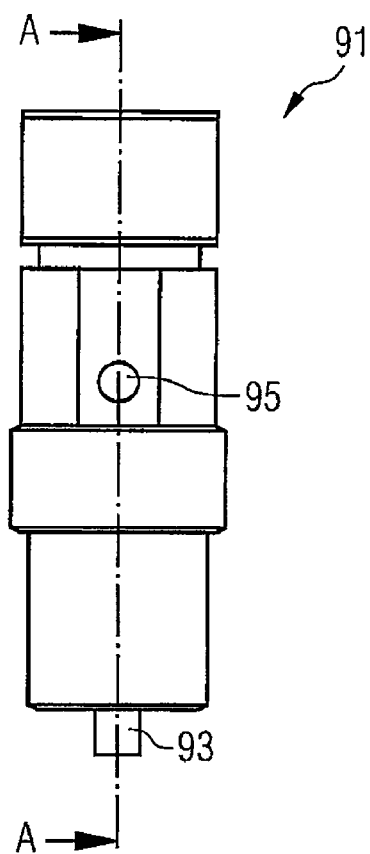
FIG. 6a is a side view of a device for generating a pressure at a pressure sensor.
Figure 6B:
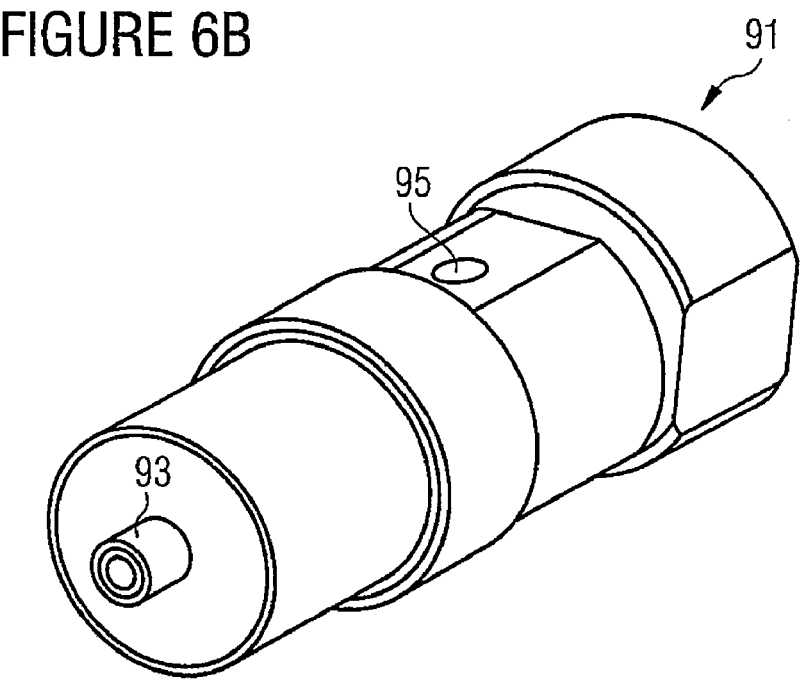
FIG. 6b is a top view of the device shown in FIG. 6a for generating a pressure at a pressure sensor.

FIGS. 6a-f show a pressure-generating device 91 with corresponding components. FIG. 6a here shows a side view of the pressure-generating device 91. An annular nozzle portion 93 and a pressure supply hole 95 can be recognized. FIG. 6b shows a top view of the pressure-generating device 91. FIG. 6b shows the annular nozzle portion 93 having a core region and an external wall region, as will be explained below.

Figure 6C:
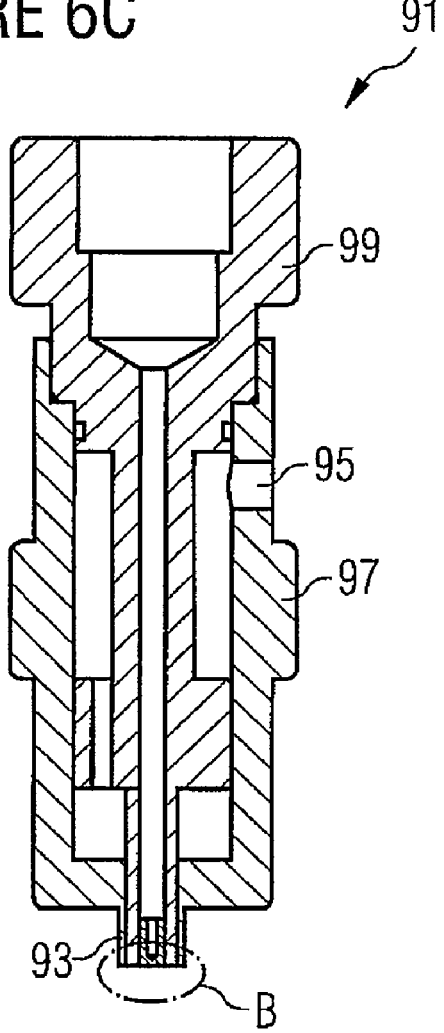
FIG. 6c is a sectional view of the device for generating a pressure at the pressure sensor.

FIG. 6c shows a sectional view of the pressure-generating device 91. In addition to the side view shown in FIG. 6a, a shaft 97 and an insert 99 are illustrated in the sectional view of the pressure-generating device 91.

Figure 6D:
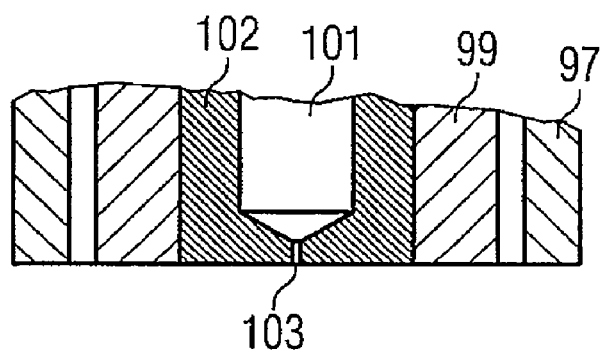
FIG. 6d is a detailed view of an outlet opening of a nozzle in the device for generating a pressure at a pressure sensor.

FIG. 6d shows a portion B from the sectional view of the pressure-generating device 91 shown in FIG. 6c. Portions of the shaft 97 and the insert 99 may be recognized in FIG. 6d. Furthermore, FIG. 6d shows a core region 101. A clearance nozzle portion 102 forms between the core region 101 and the portion of the insert 99 shown here. A plug 103 serving to influence pressure communication between a pressure-measuring chamber arranged in the core region 101 and a region around an outlet opening of the annular nozzle portion 93 is placed on the core region 101.

Figure 6E:
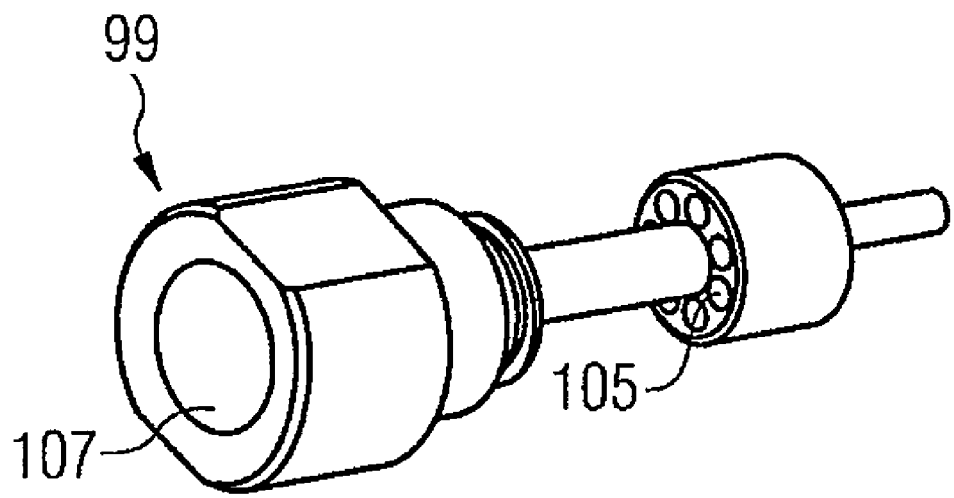
FIG. 6e is a detailed view of the insert shown in FIG. 6c in the device for generating a pressure at a pressure sensor.

FIG. 6e shows a top view of the insert 99. Several gas supply holes 105 which, among other things, serve to filter out any particles from the gas flow to prevent contamination of the wafer may be recognized there. Furthermore, the insert 99 comprises a recess 107 through which, for example, a pressure-measuring probe may be introduced to determine a pressure in a pressure-measuring chamber arranged in the insert 99.

Figure 6F:
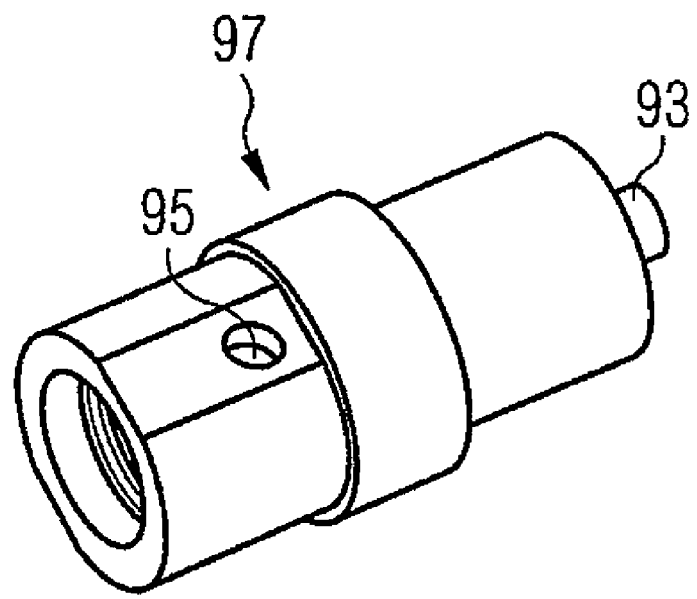
FIG. 6f is a detailed view of the shaft shown in FIG. 6c in the device for generating a pressure at a pressure sensor.

FIG. 6f shows a top view of the shaft 97. The pressure supply hole 95 and the annular nozzle portion 93 may be recognized here.

Figure 7A:
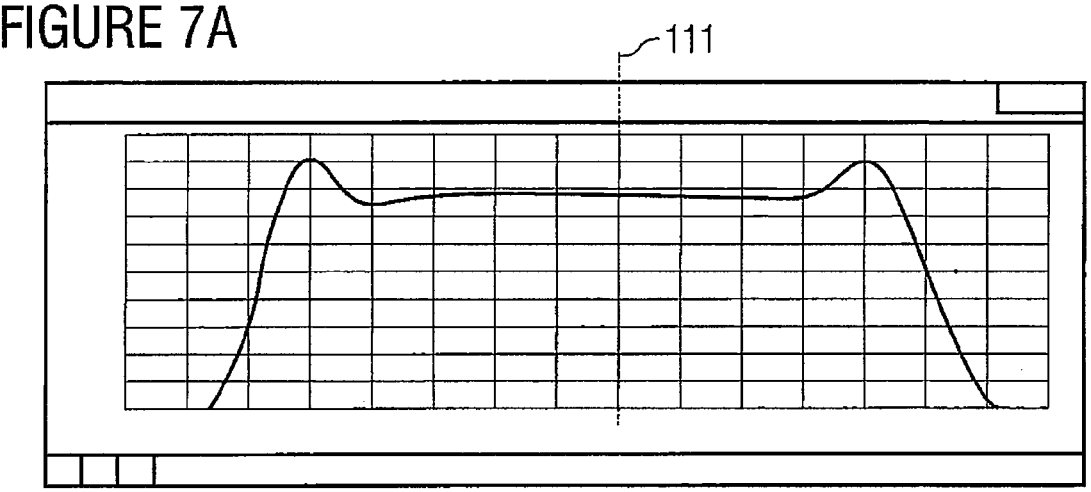
FIGS. 7a-c show a pressure distribution at an outlet opening of an annular clearance nozzle having been determined by means of an integrated active pressure measurement, a pressure-measuring chamber and the outlet opening of the annular clearance nozzle being in pressure communication via a plug.
Figure 7B:
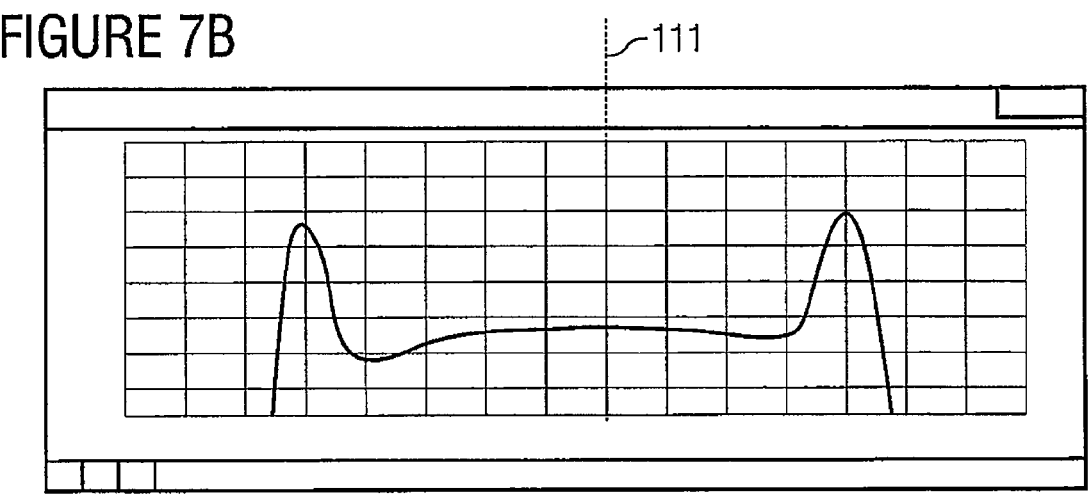
Figure 7C:
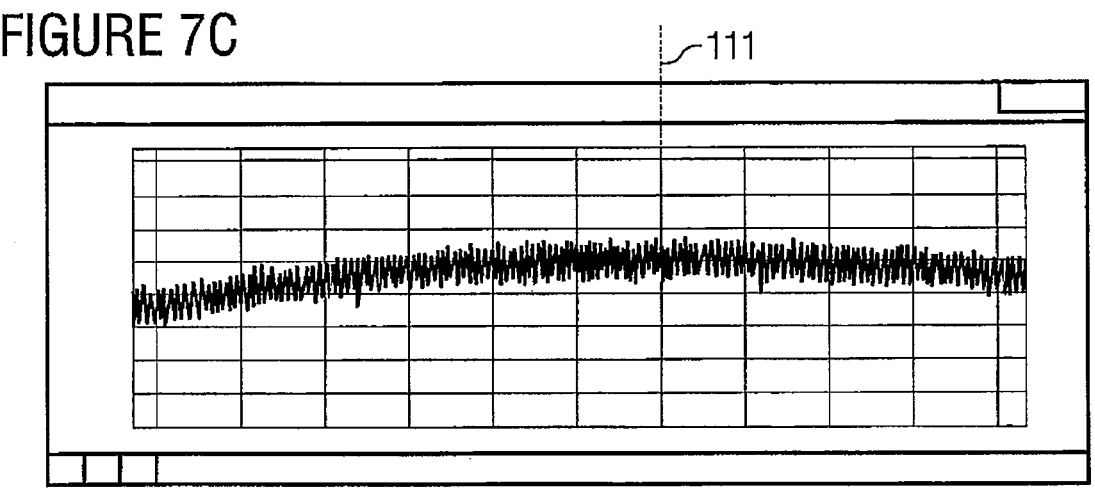

Subsequently, a function of the plug 103 for a pressure communication between a pressure-measuring chamber in a core region of an annular clearance nozzle and a measuring position at the outlet opening of an annular clearance nozzle will be explained in FIGS. 7a-c. FIG. 7a shows a measuring diagram showing a lateral distribution or radial distribution of the pressure at the outlet opening. The lateral position where the pressure in the outlet opening occurs, in FIGS. 7a-c is plotted on the x axis, wherein a broken line Ill indicates the center of the outlet opening. The pressure values are plotted on the y axis. The measuring results here are performed by a measurement setup where a plug is arranged on the sensor bore. The distance between the nozzle and the measuring table in this measurement setup is 150 µm. The diameter of the sensor bore in this measurement setup is 50 µm.

FIG. 7b discusses an extract from the measuring diagram shown in FIG. 7a. Here, the two shoulders or maximums at the edge of the overpressure region shown are considerably more marked due to the changed scale. FIG. 7c is an extract from the measuring diagram shown in FIG. 7a, from which the pressure distribution around the center of the pressure outlet opening becomes obvious. An error within a region of 0.5 mm around the center is determined from the course shown in FIG. 7c. Thus, the result for a mean maximum of the pressure in this region is a value of 3.97 bar, whereas a value of 3.92 bar results for a mean minimum. Thus, a mean value of the pressure in this region is at 3.945 bar. The resulting deviation from the pressure mean value or the error here is 0.635%.

Figure 8A:
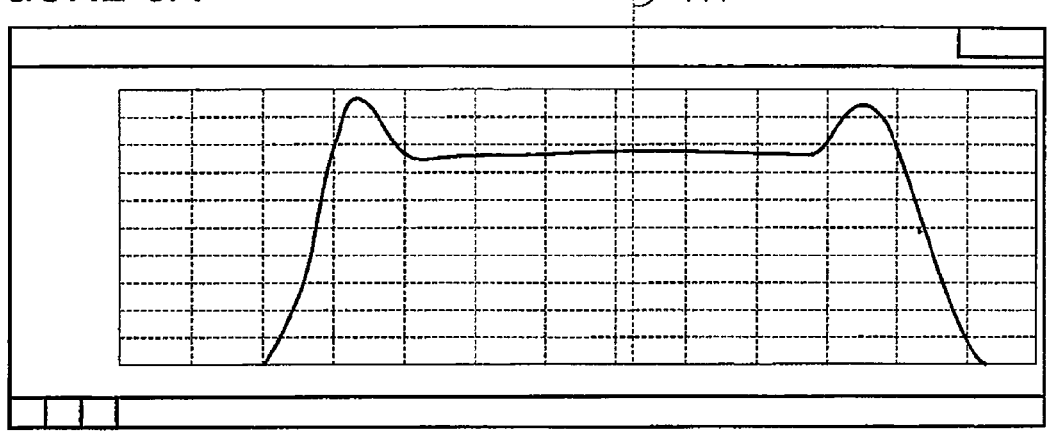
FIGS. 8a-c show a pressure distribution at an outlet opening of an annular clearance nozzle having been determined by means of an integrated active pressure measurement, the pressure-measuring chamber and the outlet opening being in pressure communication only via a hole but not via a plug.
Figure 8B:
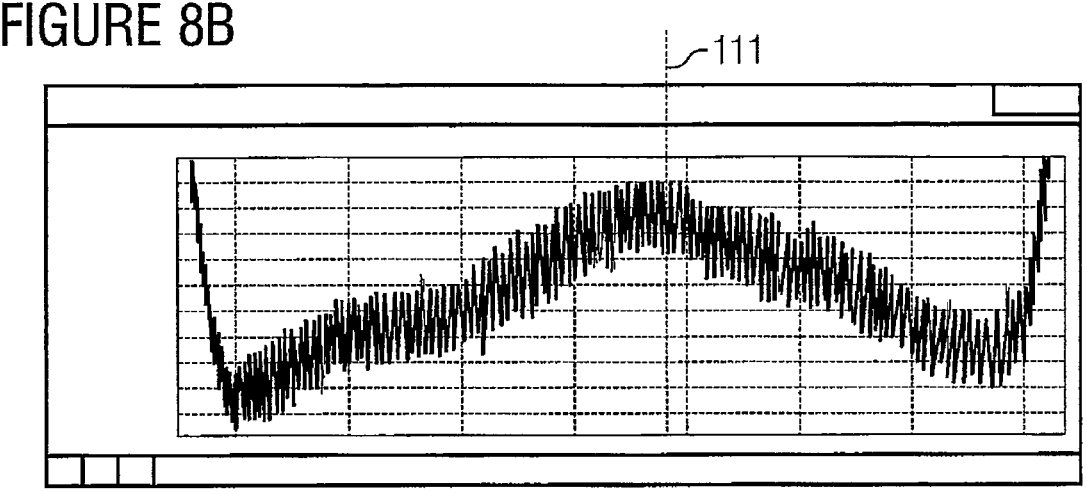
Figure 8C:
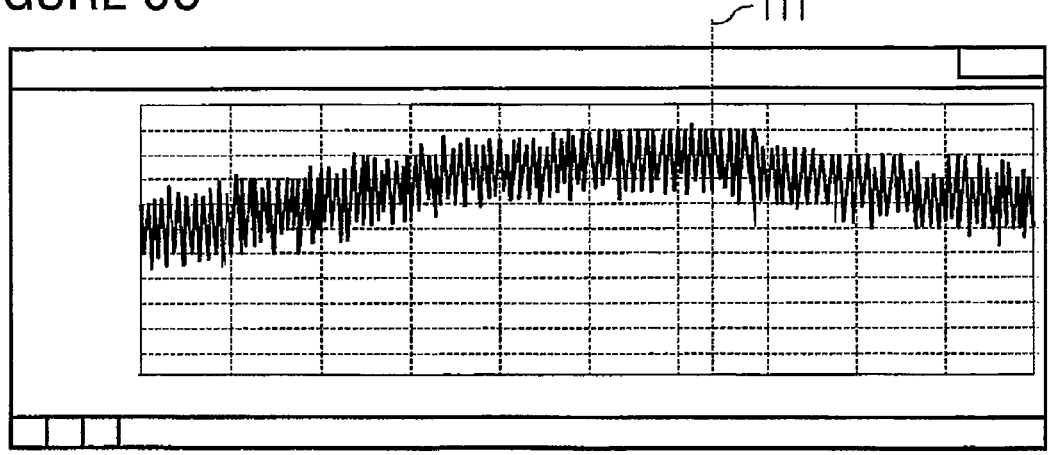

FIGS. 8a-c show a measured pressure distribution after a plug 103 arranged on the sensor bore has been removed. The respective lateral position of the measuring point in the outlet opening, in FIGS. 8a-c is plotted on the x axis, whereas the pressure is plotted on the y axis. FIG. 8a shows, as does FIG. 7a, the course of the absolute pressure value over the region where the pressure is increased, whereas FIG. 8b discusses a portion of the pressure distribution in the upper range between the two shoulders illustrated in FIG. 8a. FIG. 8c shows, as does FIG. 7c, a course of the measured pressure values in the center region around the center or in the vicinity of the center. Here, a region is considered the two edges of which are each spaced apart from this center of the nozzle by 0.25 mm. The region considered thus extends over a distance of 0.5 mm.

The influence of the opening or plug 103 on the measurement becomes obvious from FIGS. 8a-c. Thus, an error is determined for a region of 0.25 mm around the center of the nozzle or a pressure deviation in this region. Here, a mean maximum of the pressure value of 3.93 bar is determined in this region, whereas a mean minimum of the pressure value is determined to be at a value of 3.84 bar. Thus, a mean value of 3.885 bar can be calculated. This corresponds to an error in the region considered or a deviation of 1.116%.

It becomes obvious from a comparison of FIGS. 7a-c and 8a-c that a considerable reduction in the measuring error results by applying the plug 103 or the cylinder-shaped top part on the hole to the pressure-measuring chamber. The pressure-measuring chamber and the region around the outlet opening of the nozzle are in pressure communication via a recess in the plug 103 extending from the outlet opening to the hole. This recess preferably has a cylinder shape.

Figure 9:
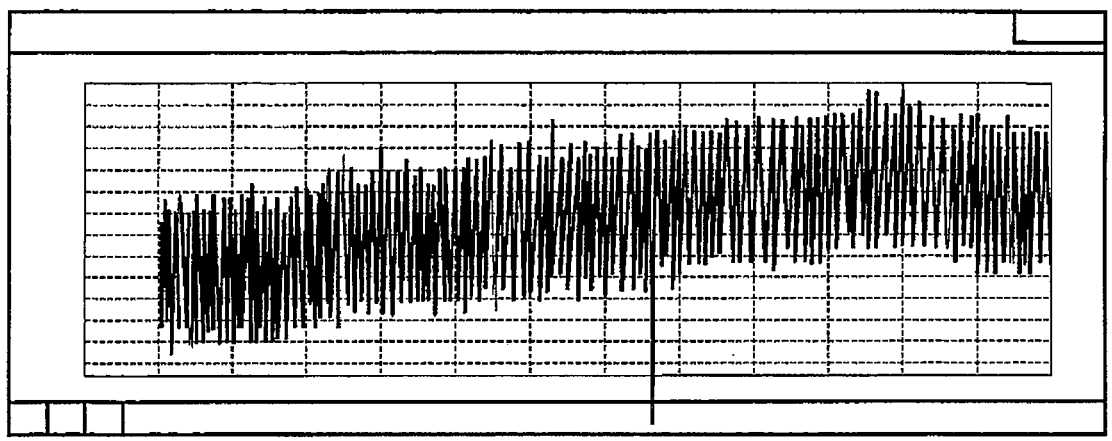
FIG. 9 shows a course of measured values of a pressure at the outlet opening of the nozzle, the sensor being directly arranged for monitoring the pressure set at the outlet opening.

FIG. 9 shows a course of the measured pressure values at the outlet opening of the annular clearance nozzle in dependence on the position of the measuring point, wherein a bore on the measuring table is closed by means of a plug and the sensor is arranged precisely above the measuring cell at the measuring table. Again, a position or positional coordinate of the measuring point is plotted on the x axis, whereas the pressure in a range from 3.76 bar to 3.9 bar is plotted on the y axis. Thus, a mean maximum of the pressure measured values is at a value of 3.8825 bar, whereas a mean minimum is at 3.7825 bar. Thus, a mean value of the absolute pressure over the entire region considered is at a value of 3.8325 bar.

Figure 10:
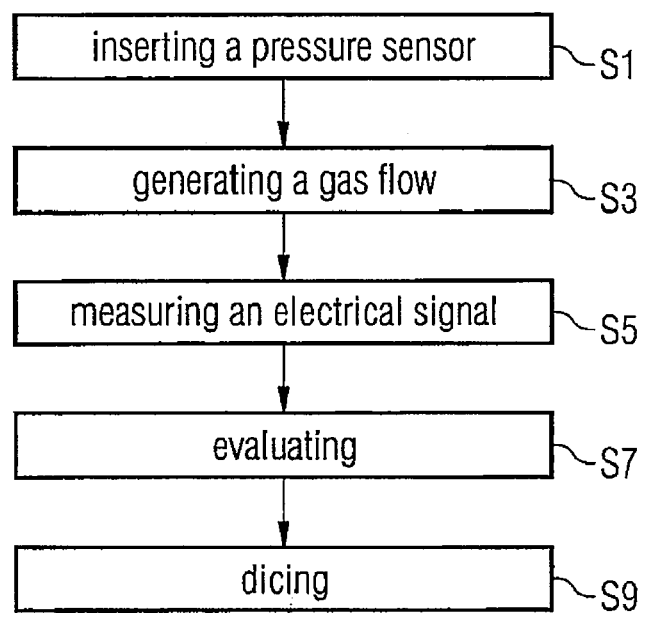
FIG. 10 shows a flow of a method for testing a pressure sensor according to an embodiment.

FIG. 10 discusses the flow of a method for testing an unhoused pressure sensor with a pressure-sensitive region arranged on a wafer. In step S1, the wafer with the pressure sensor is inserted into test equipment arranged at a tester. Subsequently, in step S3, a pressure is generated in a pressure-sensitive region of the pressure sensor by means of a gas flow interacting with the pressure-sensitive region of the pressure sensor. Here, a nozzle is positioned so close to the pressure-sensitive region that an outlet opening where the gas flows from the nozzle or enters the nozzle is so close to the pressure-sensitive region that the nozzle, on the one hand, does not contact the pressure-sensitive region but, on the other hand, an increased or decreased pressure relative to ambient pressure is in the pressure-sensitive region. The pressure present here in the pressure-sensitive region is constant within a deviation of 10% from a pressure mean value.

Subsequently, an electrical signal from the pressure sensor received by a probe card of the tester is measured in step S5. Subsequently, in step S7, evaluation is performed whether the electrical signal measured is within predetermined tolerances. By this, conclusions may be drawn as to the quality of the pressure sensor. If the electrical signal measured is not within the predetermined tolerances, the pressure sensor may be rejected or be delivered under the condition of only employing it in apparatuses with low quality requirements.

After that, the wafers are taken out of the tester. Finally, the wafers with the pressure sensors are diced in step S9. Here, the wafer is sawed so that the individual pressure sensor chips are obtained.

In the device 11 for testing a pressure sensor according to an embodiment, a pipe nozzle employed there preferably has a cylinder shape and the outlet opening of the pipe nozzle preferably has a circular shape. However, any shapes of the pipe nozzle are alternatives so that then the outlet opening, too, does not have a circular shape. Preferably, in the device for testing a pressure sensor, the pipe nozzle is embodied such that a ratio of the pipe nozzle length to a root of an outlet opening area is in a range from 6 to 80. However, any ratios are alternatives.

Preferably, the pipe-shaped nozzle in the device 11 for testing a pressure sensor has an outlet opening having such an area that a ratio of the outlet opening area of the nozzle to an area of the pressure-sensitive region is in a range from 1 to 20. However, any ratios of the area of the outlet opening of the nozzle to the area of the pressure-sensitive region are alternatives. If the pipe-shaped nozzle has a cylinder shape and the pressure-sensitive region is circular, a ratio of a radius of the cylinder-shaped region to a radius of the pressure-sensitive region preferably is in a range from 1 to 20. However, any ratios are alternatives.

In the device 11 for testing a pressure sensor, a distance between the pressure sensor and an outlet opening of the nozzle is preferably selected such that a ratio of a distance between the pressure-sensitive region of the pressure sensor and an outlet opening of the pipe-shaped nozzle or the pipe nozzle to a radius of the nozzle is in a range from 0.02 to 0.2. However, any ratios are alternatives. Preferably, in the device for testing a pressure sensor, a radius of the cylinder-shaped nozzle is in a range from 0.1 mm to 10 mm, any ratios, however, being alternatives.

Preferably, a ratio of the area surrounded by the external wall region 53 of the annular clearance nozzle 51 in the device 11 to the area of the pressure-sensitive region 27 of the pressure sensor is in a range from 1 to 20, however any ratios are alternatives. Preferably, in the device for testing a pressure sensor, the core region 55 and the external wall region 53 of the annular clearance nozzle 51 have cylinder-shapes, any forms of the external wall region and the core region 57, however, being alternatives.

Preferably, a ratio of an internal radius of the external wall region to a distance between the pressure-sensitive area and the outlet opening of the cylinder-shaped annular clearance nozzle is in a range from 1 to 20, however, any ratios of the internal radius of the external wall region to a distance between the pressure-sensitive area and the outlet opening of the annular clearance nozzle being alternatives.

Preferably, a ratio of an external radius of the core region and an internal radius of the external wall region in the cylinder-shaped annular clearance nozzle 51 is in a range from 0.3 to 0.6, however, any ratios of the external radius of the core region and the internal radius of the external wall region being alternatives.

Preferably, in the device for testing a pressure sensor, the internal radius of the external wall region of the cylinder-shaped annular clearance nozzle is in a range from 0.5 mm to 10 mm, however, any dimensions of the internal radius of the external wall region being alternatives.

The device 11 for testing a pressure sensor has a single pressure vessel 17 having an outlet nozzle 17b. However, the device 11 might also comprise several pressure vessels or one pressure vessel having several outlet nozzles to test a group of mechanically connected pressure sensors arranged on a wafer. The outlet nozzles here are positioned opposite the further pressure-sensitive regions in the group of pressure sensors so that the gas flow generated by the outlet nozzles in the pressure-sensitive regions generates a respective pressure increased or decreased relative to ambient pressure, wherein the respective pressure value is constant within a deviation of 10% from a mean value.

The electrical evaluating means may then preferably receive and measure a respective electrical signal from another pressure sensor or the group of further pressure sensors. Thus, parallel testing of the pressure sensors on a wafer becomes possible in the device for testing a pressure sensor. Thus, a respective pressure in the pressure-sensitive region is generated at the same time via a plurality of nozzles which are correspondingly positioned opposite the pressure-sensitive regions of the pressure sensors, wherein the tester or the device for testing simultaneously receives and measures a respective signal from the pressure sensors.

Preferably, in the interactive nozzle shown in FIG. 6d, a ratio of a radius of the hole onto which the plug 103 is placed to a radius of the core region 101 is in a range from 0.05 to 0.5. However, any ratios are alternatives.

Preferably, the value of the radius of the hole in the core region in the interactive nozzle shown in FIG. 6d is in a range from 10 μm to 500 μm, however, any radii of the hole which are smaller than the radius of the core region being alternatives. Preferably, the plug 103 or the cylinder-shaped top part on the hole has such a length that a ratio of the length of the cylinder-shaped top part to an external radius of the core region is in a range from 0.1 to 0.7. However, any lengths of the plug or ratios of the length of the plug to the external radius of the core region are alternatives. The plug 103 might also have any external shape.

In the device 11 for testing a pressure sensor, a gas flows from the nozzle and reaches the pressure-sensitive region 27 and thus produces an overpressure in the pressure-sensitive region compared to ambient pressure. However, in the device 11 a gas might alternatively also flow into the nozzle 17b so that a negative pressure compared to ambient pressure is generated in the pressure-sensitive region.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for testing a pressure sensor having a pressure-sensitive region, comprising:
    a fixture for a pressure sensor designed to receive the pressure sensor;
    a nozzle designed to generate a gas flow interacting with the pressure-sensitive region of the pressure sensor and positioned so close to the pressure-sensitive region such that the nozzle does not contact the pressure-sensitive region of the pressure sensor and a predefined portion of the pressure-sensitive region experiences an increased or decreased pressure relative to ambient pressure which is constant within a deviation of 10% relative to a pressure mean value; and
    a measurer designed to measure an electrical signal received by the pressure sensor.

2. The device for testing a pressure sensor according to claim 1, wherein the nozzle is positioned opposite the fixture such that a clearance through which a gas may flow forms between the pressure sensor and the nozzle such that the nozzle and the portion of the pressure-sensitive region do not form an air-tight sealed space.

3. The device for testing a pressure sensor according to claim 1, wherein the nozzle comprises a continuous pipe shape.

4. The device for testing a pressure sensor according to claim 1, wherein a ratio of a length of the nozzle to a root of an area of an outlet opening of the nozzle is in a range form 6 to 80.

5. The device for testing a pressure sensor according to claim 1, wherein a ratio of an area of an outlet opening of the nozzle to an area of the pressure-sensitive region is in a range from 1 to 20.

6. The device for testing a pressure sensor according to claim 1, wherein the nozzle has a cylinder shape.

7. The device for testing a pressure sensor according to claim 6, wherein a ratio of a distance between the pressure-sensitive region of the pressure sensor and an outlet opening of the nozzle to a radius of the nozzle is in a range from 0.02 to 0.2.

8. The device for testing a pressure sensor according to claim 6, wherein a radius of the nozzle is in a range from 0.1 mm to 10 mm.

9. The device for testing a pressure sensor according to claim 1, wherein the nozzle is embodied as a continuous clearance between a core region and an external wall region, wherein the external wall region surrounds the core region, and the clearance is embodied to guide the gas flow to or away from an outlet opening of the nozzle, and the core region and the external wall region are formed from a solid material so that there is no gas flow in them.

10. The device for testing a pressure sensor according to claim 9, wherein a ratio of a length of the nozzle to a root of an area of the outlet opening of the nozzle is in a range from 5 to 50.

11. The device for testing a pressure sensor according to claim 9, wherein a ratio of an area surrounded by the external wall region to the area of the pressure-sensitive region is in a range from 1 to 20.

12. The device for testing a pressure sensor according to claim 9, wherein the core region and the external wall region have cylinder shapes.

13. The device for testing a pressure sensor according to claim 12, wherein a ratio of an internal radius of the external wall region to a distance between the pressure-sensitive region and the outlet opening of the nozzle is in a range from 1 to 20.

14. The device for testing a pressure sensor according to claim 12, wherein a ratio of an external radius of the core region and an internal radius of the external wall region is in a range from 0.3 to 0.6.

15. The device for testing a pressure sensor according to claim 12, wherein the internal radius of the external wall region has a value in a range from 0.5 mm to 10 mm.

16. The device for testing a pressure sensor according to claim 1, wherein the nozzle is positioned such that the pressure in the pressure-sensitive region is constant within a deviation of 1% relative to the pressure mean value.

17. The device for testing a pressure sensor according to claim 1, which is designed to test a pressure sensor arranged in a group of mechanically interconnected pressure sensors on a wafer.

18. The device for testing a pressure sensor according to claim 17, comprising another nozzle spaced apart from the nozzle, wherein the other nozzle is designed to generate a gas flow interacting with a pressure-sensitive region of another pressure sensor and to generate in the pressure-sensitive region of the other pressure sensor a pressure which is constant within a deviation of 10% relative to a pressure mean value, the measurer being designed to measure an electrical signal received by the other pressure sensor.

19. The device for measuring a pressure sensor according to claim 18, which is designed to generate a pressure simultaneously via the nozzle and the other nozzle in the two pressure-sensitive regions of the pressure sensor and the other pressure sensor, and wherein the measurer is designed to measure the signal received by the pressure sensor and the other pressure sensor simultaneously.

20. A method for testing a pressure sensor having a pressure-sensitive region, comprising:
   generating a gas flow interacting with the pressure-sensitive region of the pressure sensor; and
   measuring an electrical signal provided by the pressure sensor;
   wherein the step of generating comprises positioning the nozzle in a pressure-sensitive region such that the nozzle does not contact the pressure-sensitive region so that a predefined portion of the pressure-sensitive region experiences an increased or decreased pressure relative to ambient pressure which is constant within a deviation of 10% relative to a pressure mean value.

21. The method according to claim 20, wherein the step of measuring is followed by a step of evaluating, wherein the step of evaluating includes determining whether the electrical signal measured is within a predefined region or not.

22. The method according to claim 20, wherein the step of measuring is followed by a step of dicing, wherein in the step of dicing a plurality of mechanically separate pressure sensors are produced from a plurality of pressure sensors arranged on a wafer.

23. A nozzle having a continuous flow region arranged between an external wall and a core region of a pipe and designed to guide a gas flow to an outlet opening of the nozzle or to guide same from the outlet opening of the nozzle, wherein the core region and the external wall are along the pipe and are formed of a solid material such that the gas flow cannot propagate within the core region and the external wall, and the core region has a hole designed to adjust a pressure in a pressure-measuring chamber at least partly arranged in a recess in the core region to a pressure at the outlet opening.

24. The nozzle according to claim 23, wherein the core region, the external wall and the hole have cylinder shapes and a ratio of a radius of the hole to a radius of the core region is in a range from 0.005 to 0.05.

25. The nozzle according to claim 24, wherein the radius of the hole in the core region is in a range from 10 µm to 500 µm.

26. The nozzle according to claim 23, wherein a cylinder-shaped top part is arranged on the core region around the hole having a cylinder-shaped recess extending from the outlet opening of the nozzle to the hole and designed to produce pressure communication between the hole and the outlet opening, wherein the cylinder-shaped top part, within predetermined tolerances, has the same radius as the hole.

27. The nozzle according to claim 26, wherein a ratio of a length of a cylinder-shaped part to an external radius of the core region is in a range from 0.1 to 0.7.

* * * * *